United States Patent
Suzuki et al.

(10) Patent No.: US 11,971,423 B2
(45) Date of Patent: Apr. 30, 2024

(54) AUTOMATED ANALYSIS DEVICE, AND METHOD FOR CONVEYING SAMPLE

(71) Applicant: HITACHI HIGH-TECH CORPORATION, Tokyo (JP)

(72) Inventors: Naoto Suzuki, Tokyo (JP); Masashi Akutsu, Tokyo (JP); Akihiro Yasui, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 773 days.

(21) Appl. No.: 17/052,828

(22) PCT Filed: May 16, 2019

(86) PCT No.: PCT/JP2019/019476
§ 371 (c)(1),
(2) Date: Nov. 4, 2020

(87) PCT Pub. No.: WO2019/235158
PCT Pub. Date: Dec. 12, 2019

(65) Prior Publication Data
US 2021/0239721 A1   Aug. 5, 2021

(30) Foreign Application Priority Data
Jun. 6, 2018  (JP) .................. 2018-108636

(51) Int. Cl.
*G01N 35/00* (2006.01)
*G01N 35/02* (2006.01)

(52) U.S. Cl.
CPC ......... *G01N 35/0092* (2013.01); *G01N 35/02* (2013.01); *G01N 2035/00752* (2013.01)

(58) Field of Classification Search
CPC ............... G01N 35/0092; G01N 35/02; G01N 2035/00752
See application file for complete search history.

(56) References Cited

U.S. PATENT DOCUMENTS

| 2008/0181817 A1 | 7/2008 | Mimura et al. |
| 2012/0177536 A1 | 7/2012 | Sakai et al. |

(Continued)

FOREIGN PATENT DOCUMENTS

| JP | 2001-004636 A | 1/2001 |
| JP | 2003-262642 A | 9/2003 |

(Continued)

OTHER PUBLICATIONS

Supplementary European Search Report received in corresponding European Application No. EP 19 81 4225 dated Jan. 20, 2022.

(Continued)

*Primary Examiner* — Jill A Warden
*Assistant Examiner* — Alex Ramirez
(74) *Attorney, Agent, or Firm* — MATTINGLY & MALUR, PC

(57) ABSTRACT

An automatic analyzer is capable of transporting a sample at an optimum timing and a method of transporting the sample. An automatic analyzer includes an analysis unit which measures a sample, a transport unit which transports the sample to the analysis unit, and a control unit which controls the analysis unit and the transport unit. A sample is transported to the analysis unit by a time of starting an aspirating operation on the sample by allowing the analysis unit to perform a pre-measurement operation for each measuring method which needs to be performed before aspirating the sample even when the sample is still in the transport unit.

7 Claims, 28 Drawing Sheets

(56) References Cited

U.S. PATENT DOCUMENTS

2013/0125675 A1   5/2013  Muller et al.
2016/0349279 A1  12/2016  Koike et al.
2017/0269113 A1* 9/2017  Makino ................. G01N 21/11

FOREIGN PATENT DOCUMENTS

| JP | 2009-036723 A | 2/2009 |
| JP | 2010-107403 A | 5/2010 |
| JP | 2010-281634 A | 12/2010 |
| JP | 2012173251 A | 9/2012 |
| JP | 2013-178161 A | 9/2013 |
| WO | 2014127379 A1 | 8/2014 |

OTHER PUBLICATIONS

International Search Report of PCT/JP2019/019476 dated Aug. 13, 2019.
International Preliminary Report on Patentability received in corresponding International Application No. PCT/JP2019/019476 dated Dec. 10, 2020.

* cited by examiner

[FIG. 1]
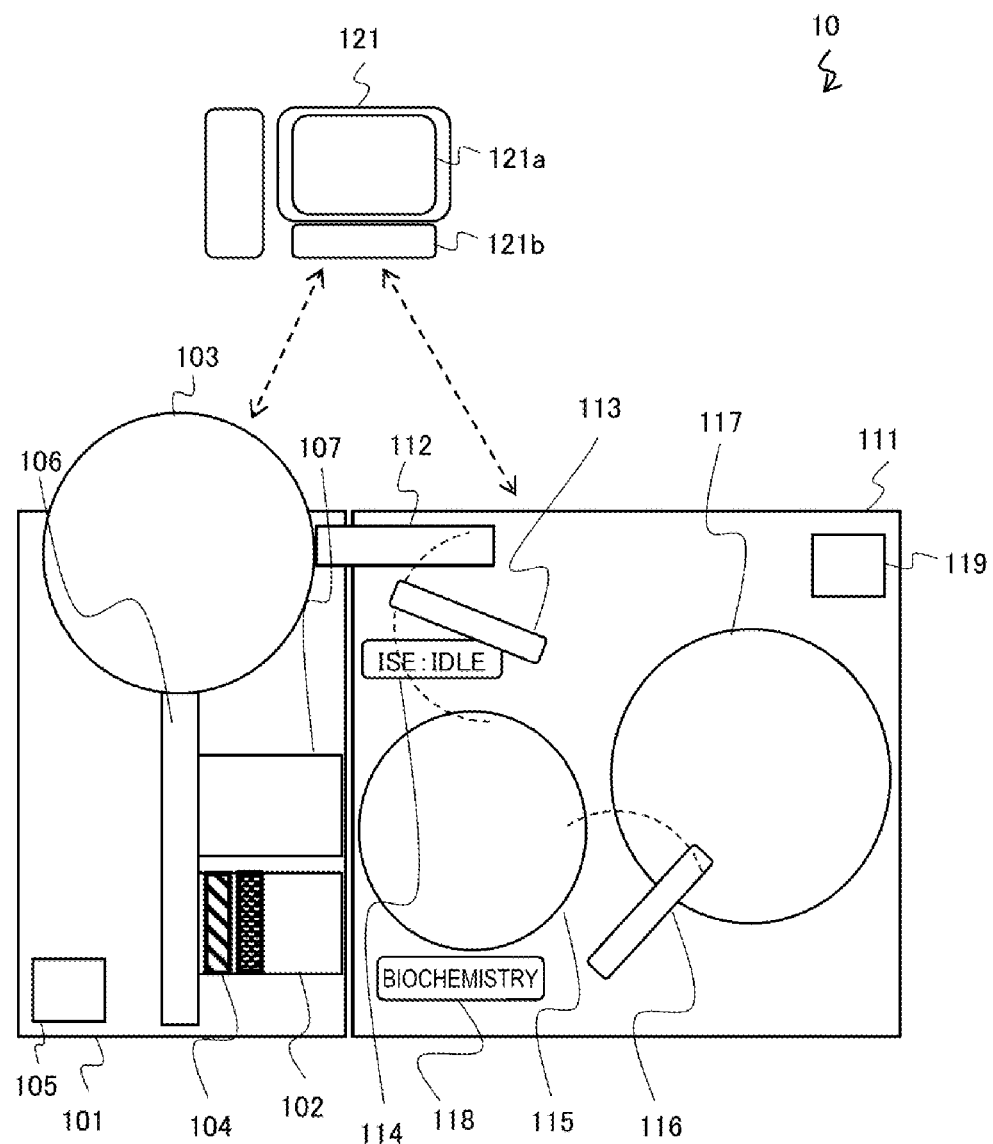

[FIG. 2]
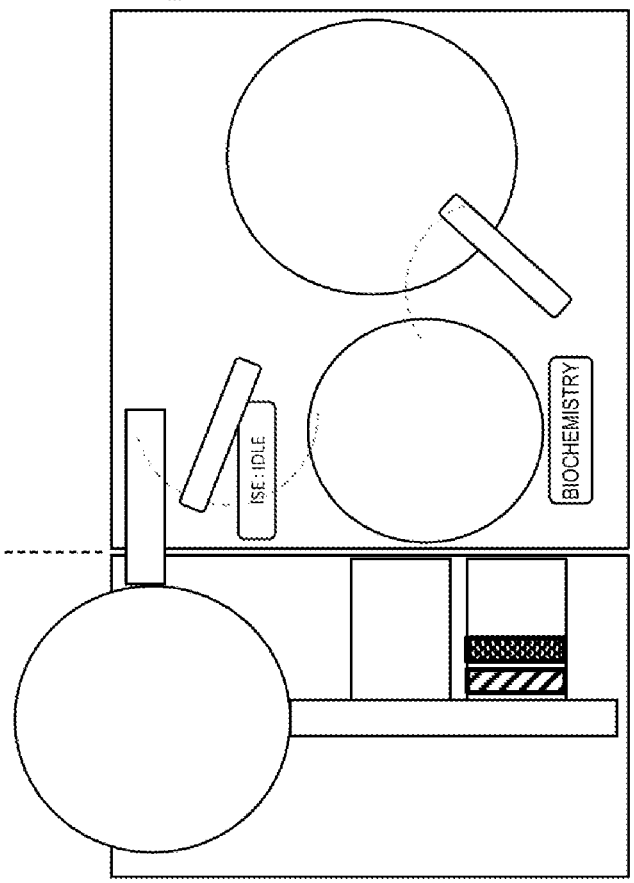

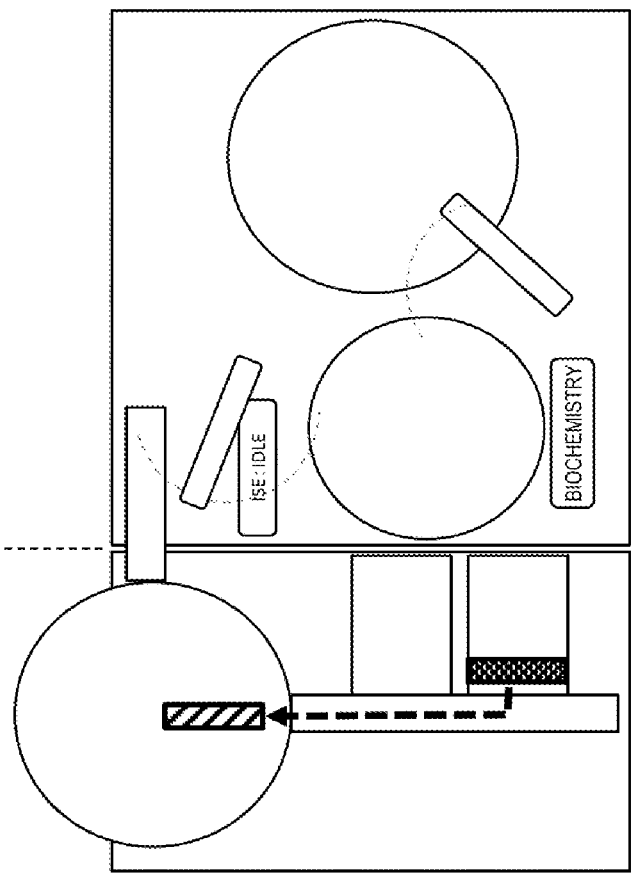

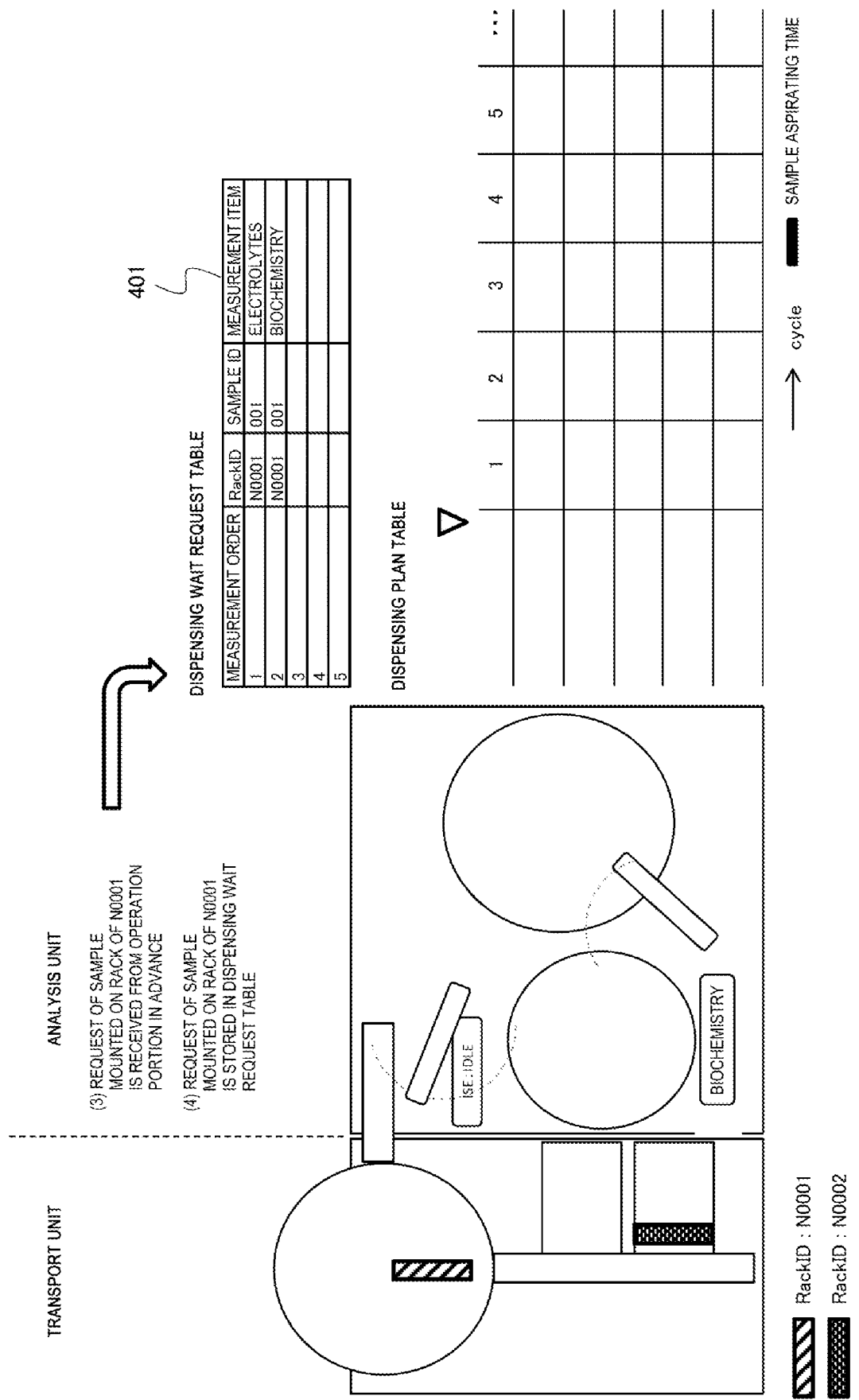

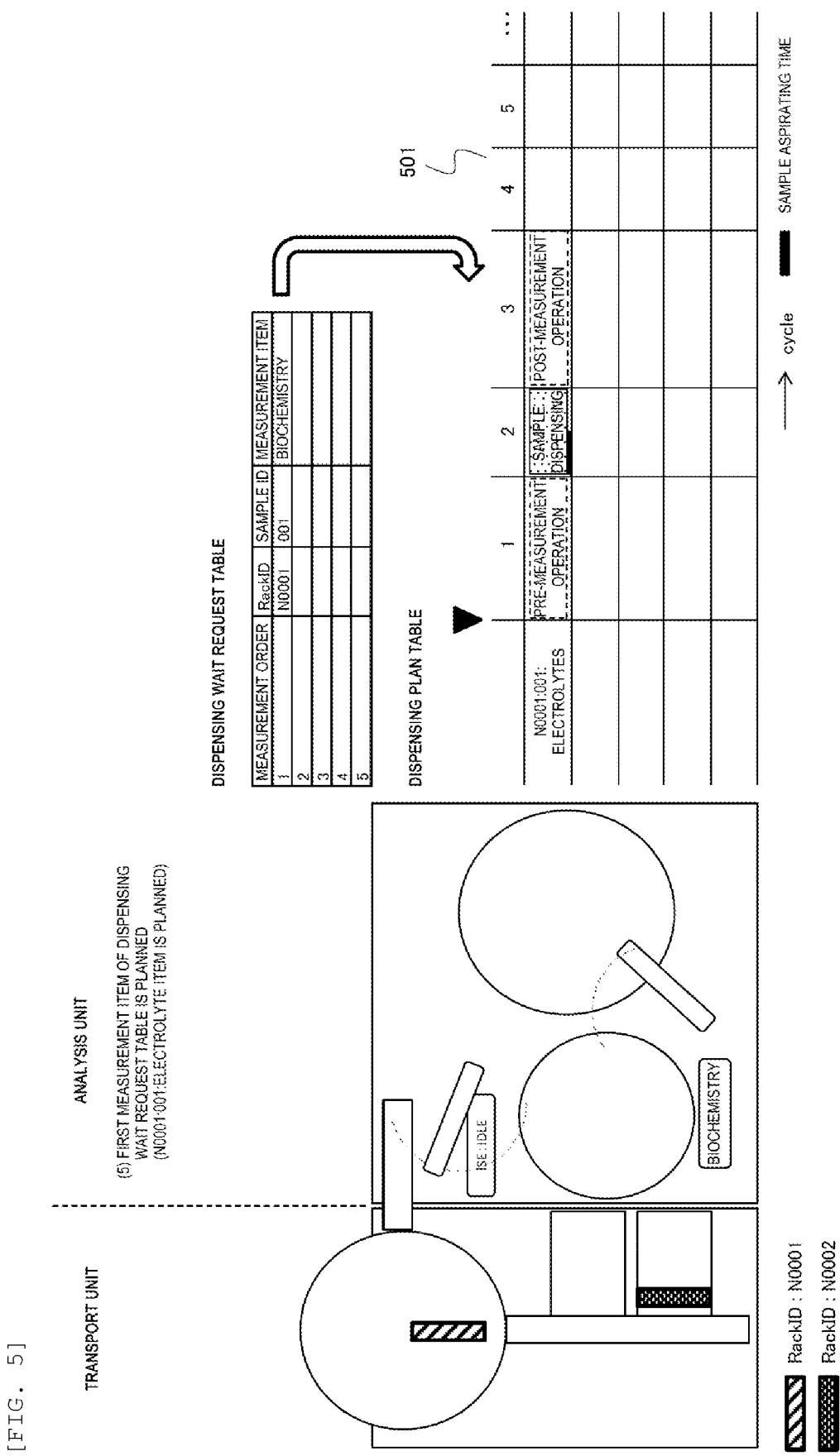
[FIG. 5]

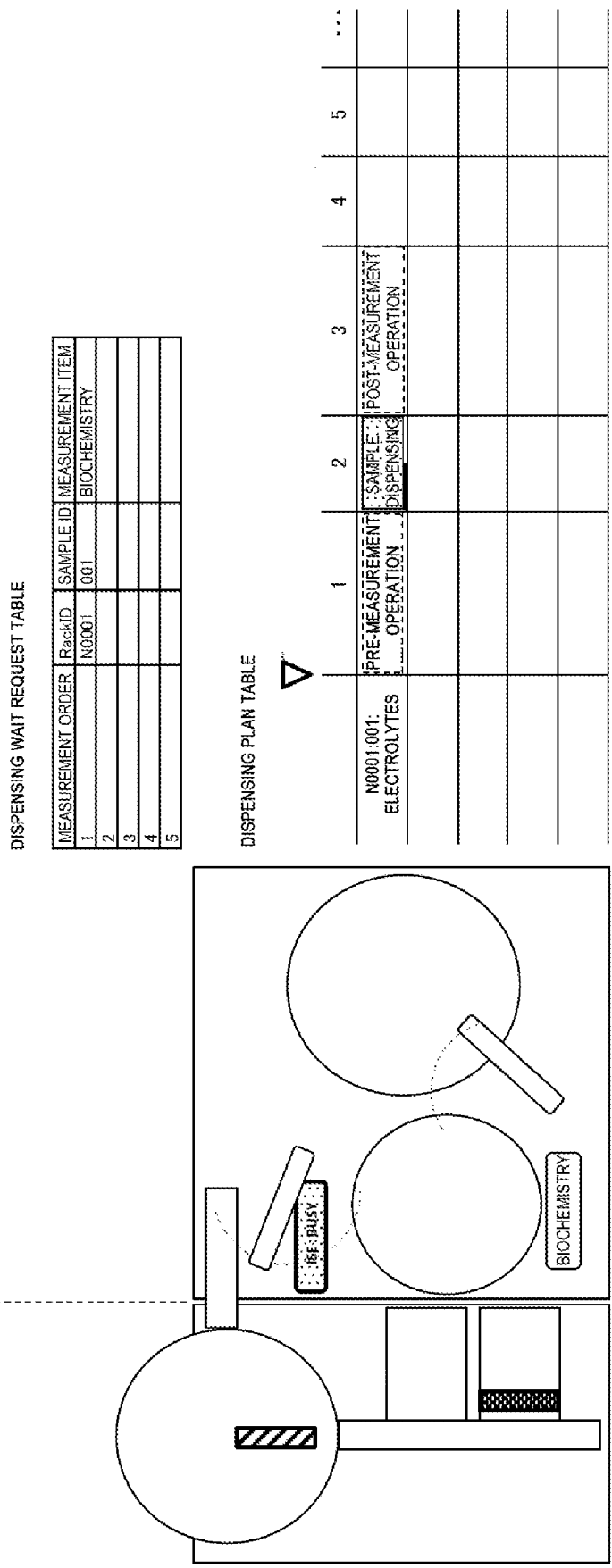
[FIG. 6]

[FIG. 7]
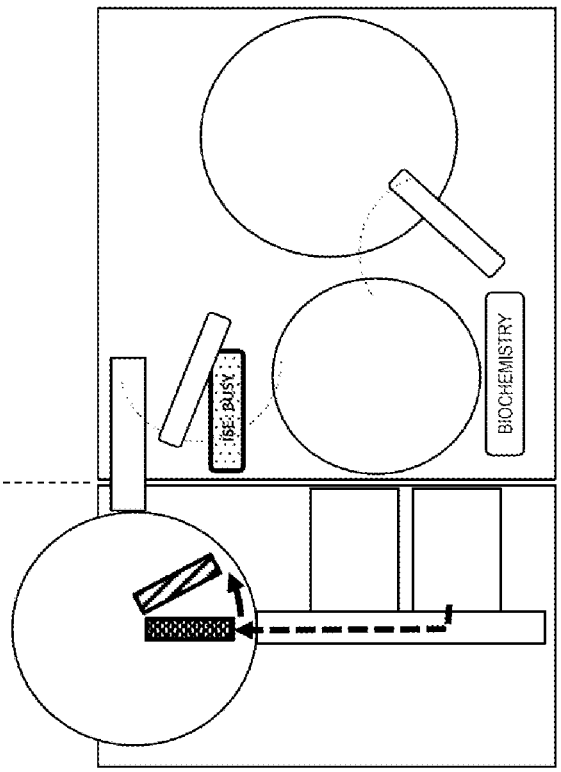

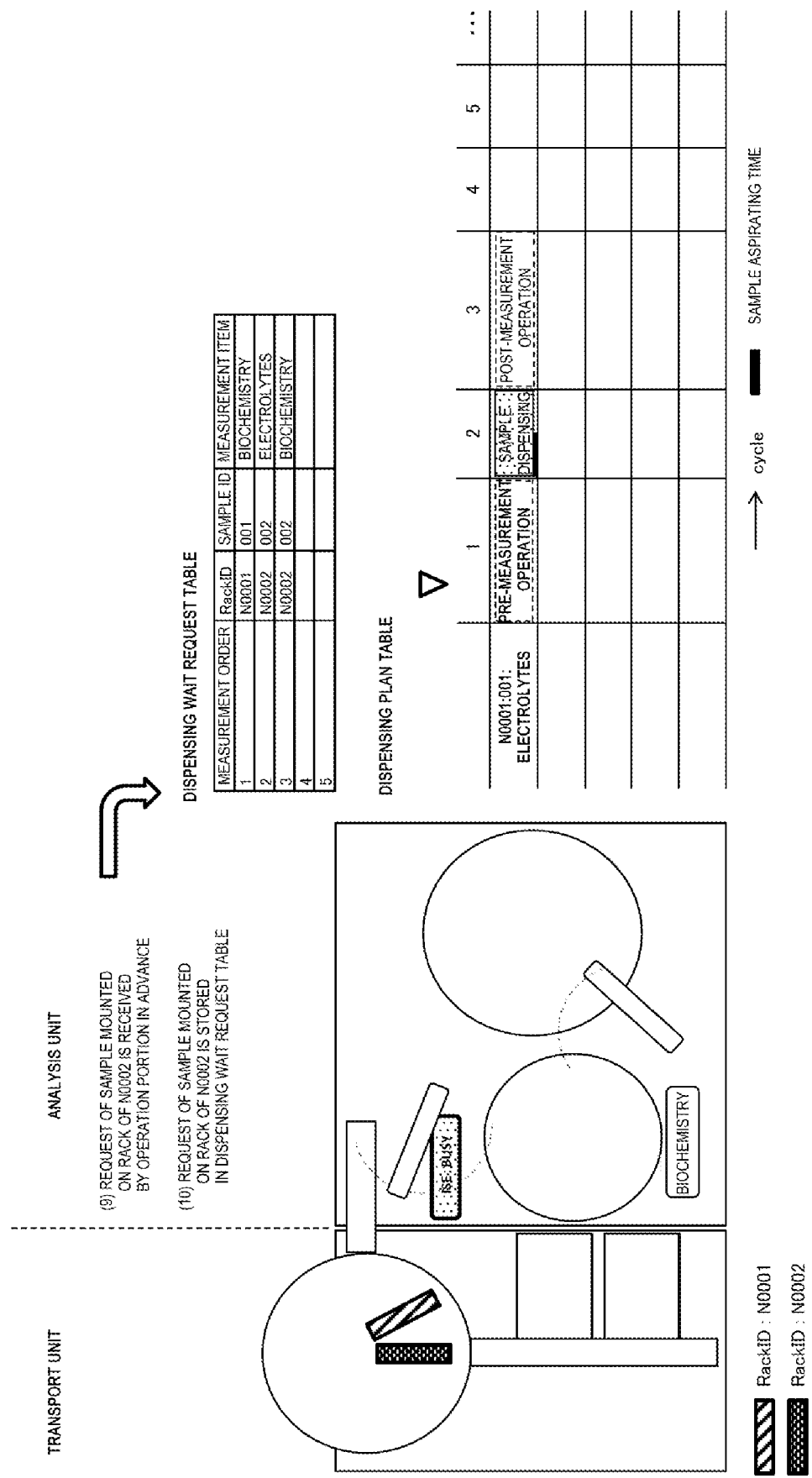
[FIG. 8]

[FIG. 9]
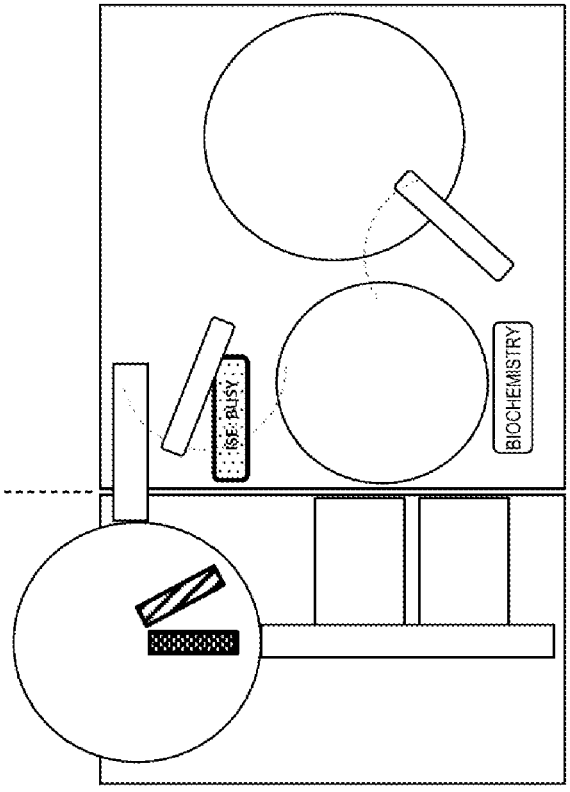

[FIG. 10]
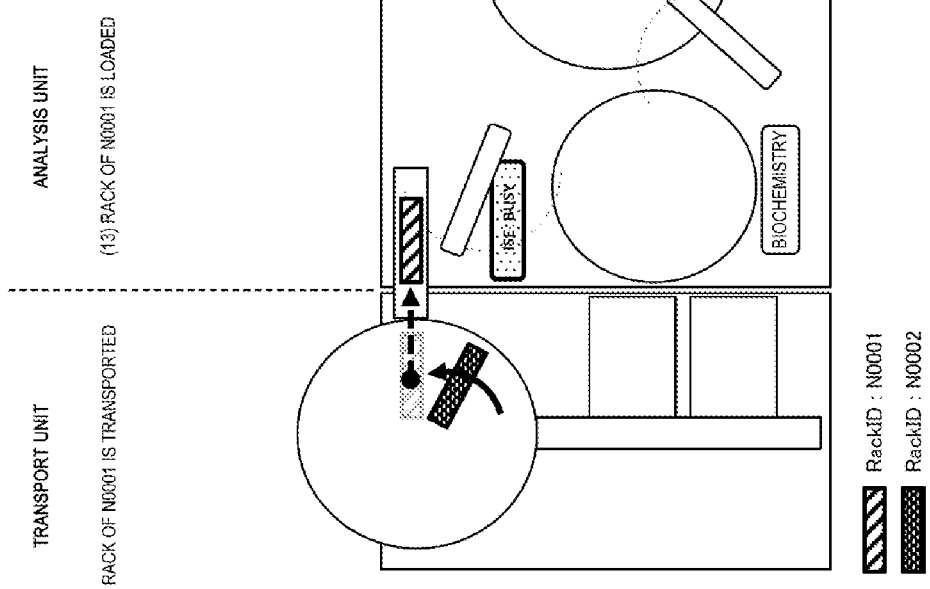

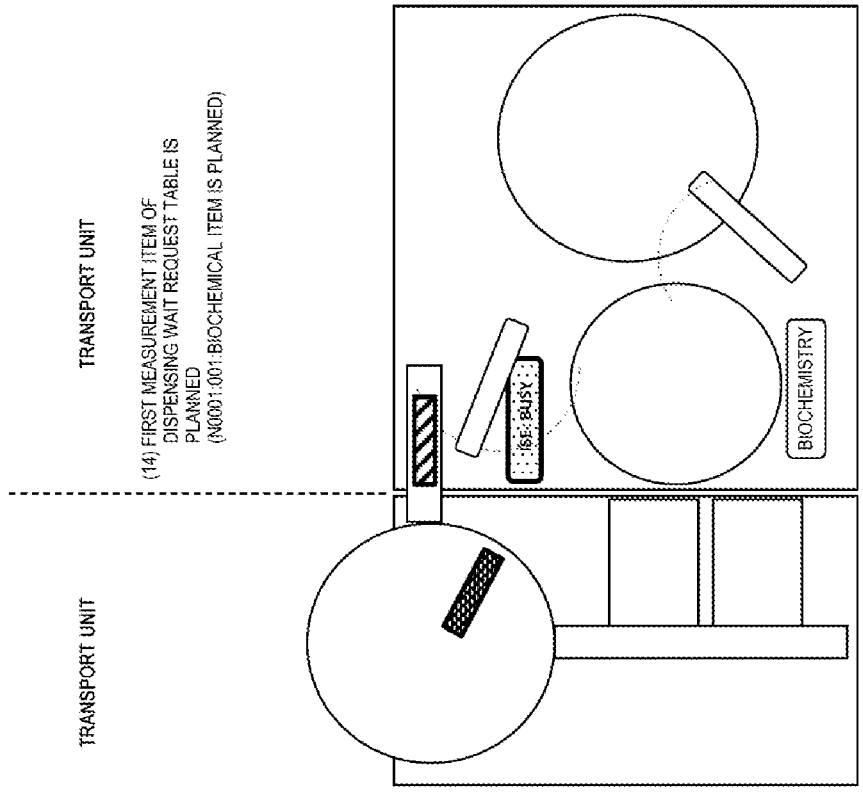
[FIG. 11]

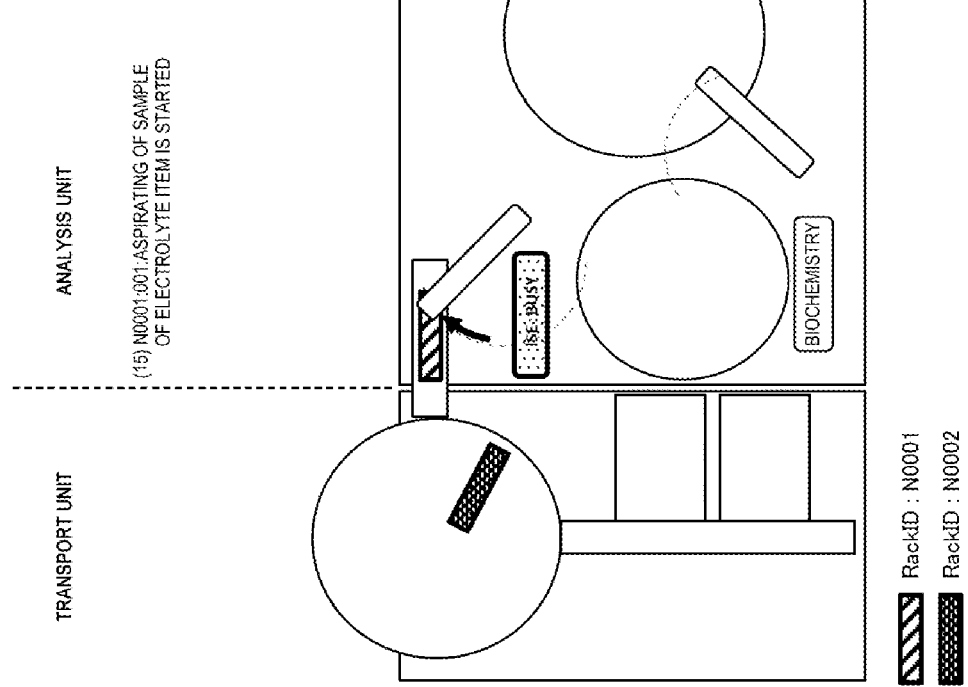
[FIG. 12]

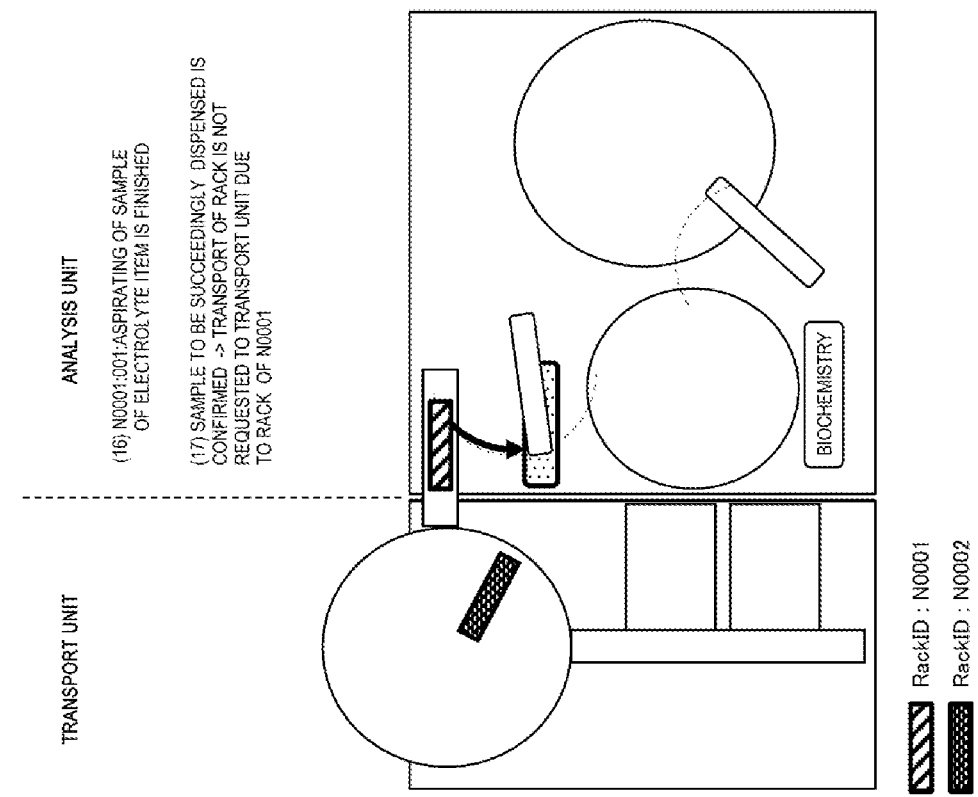
[FIG. 13]

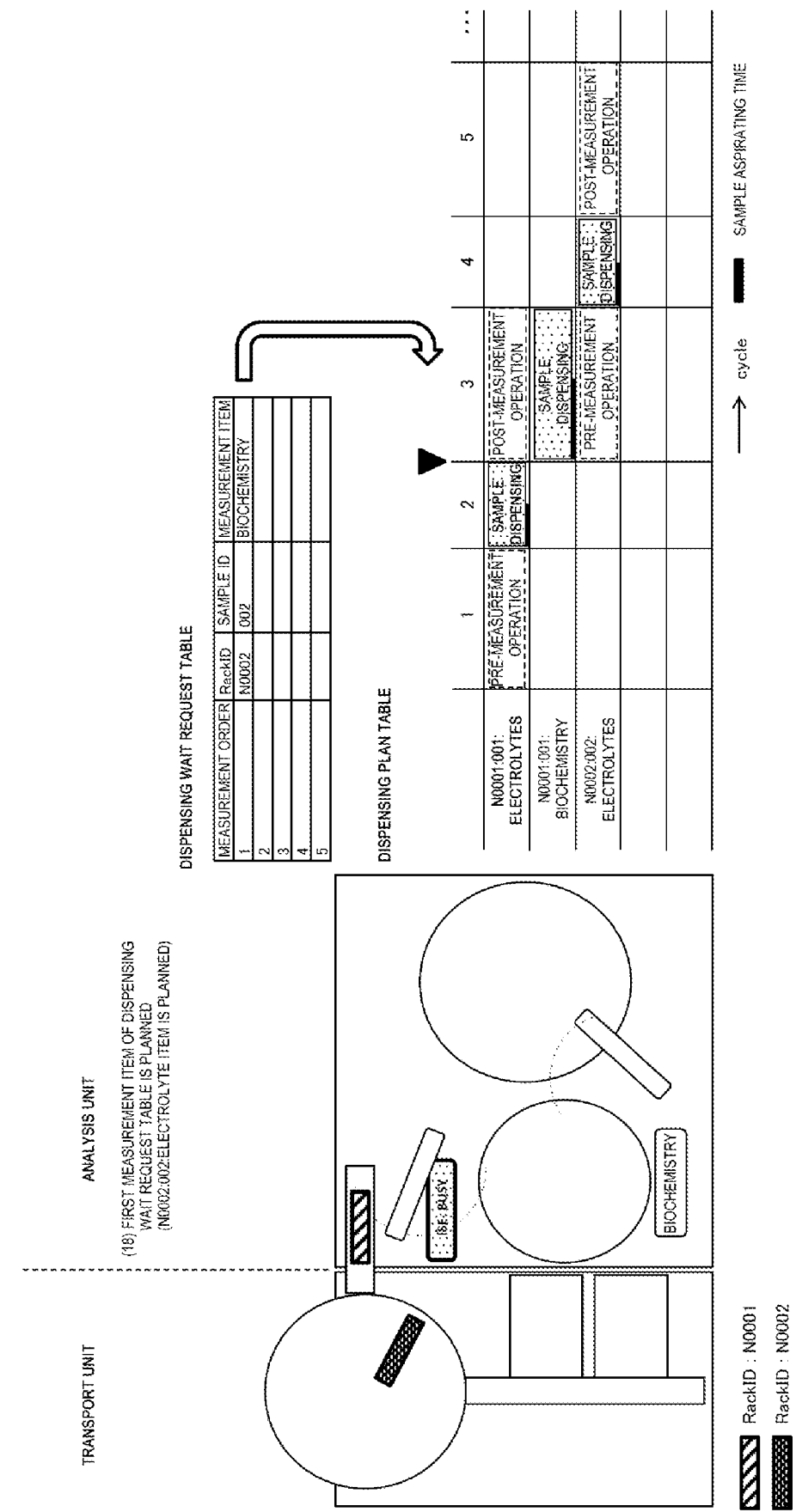
[FIG. 14]

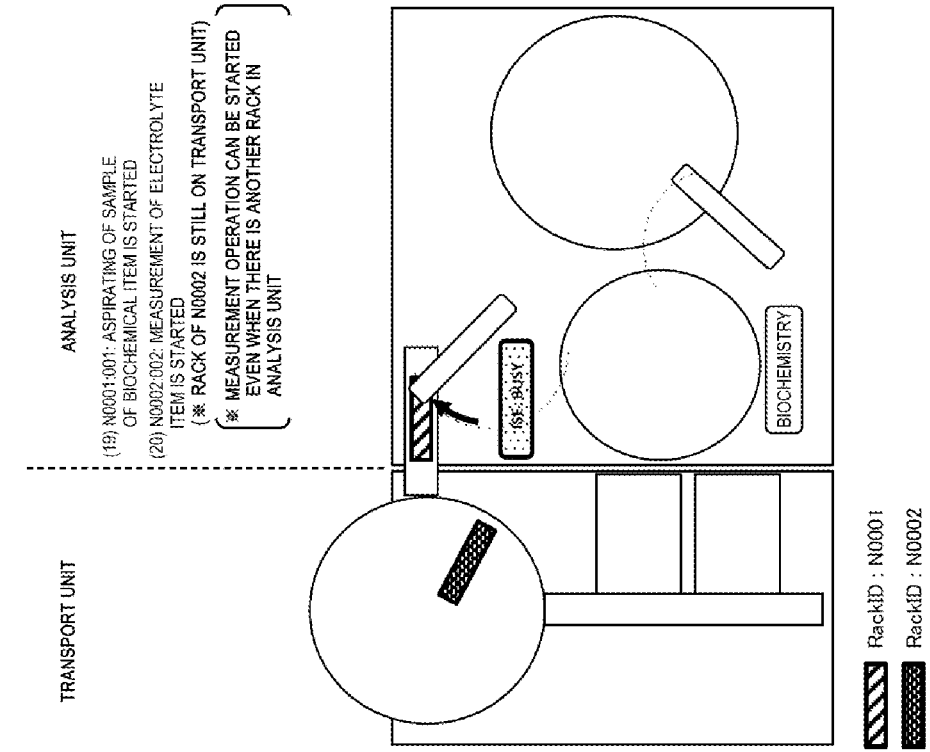
[FIG. 15]

[FIG. 16]
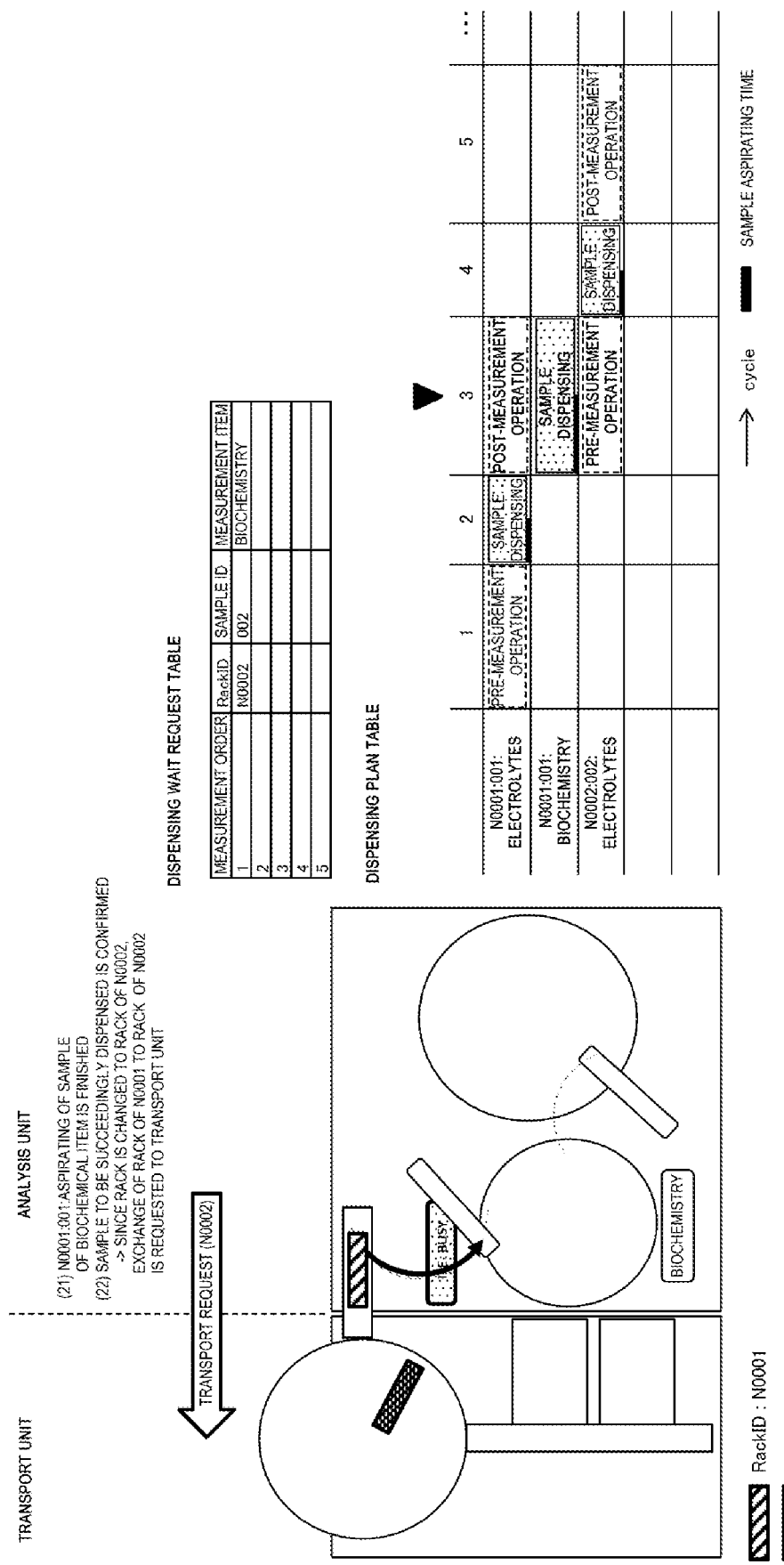

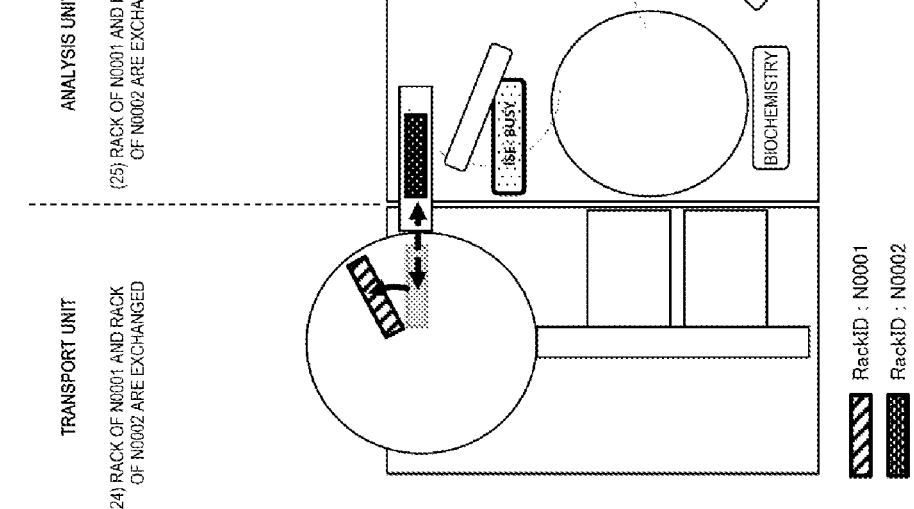
[FIG. 17]

[FIG. 18]
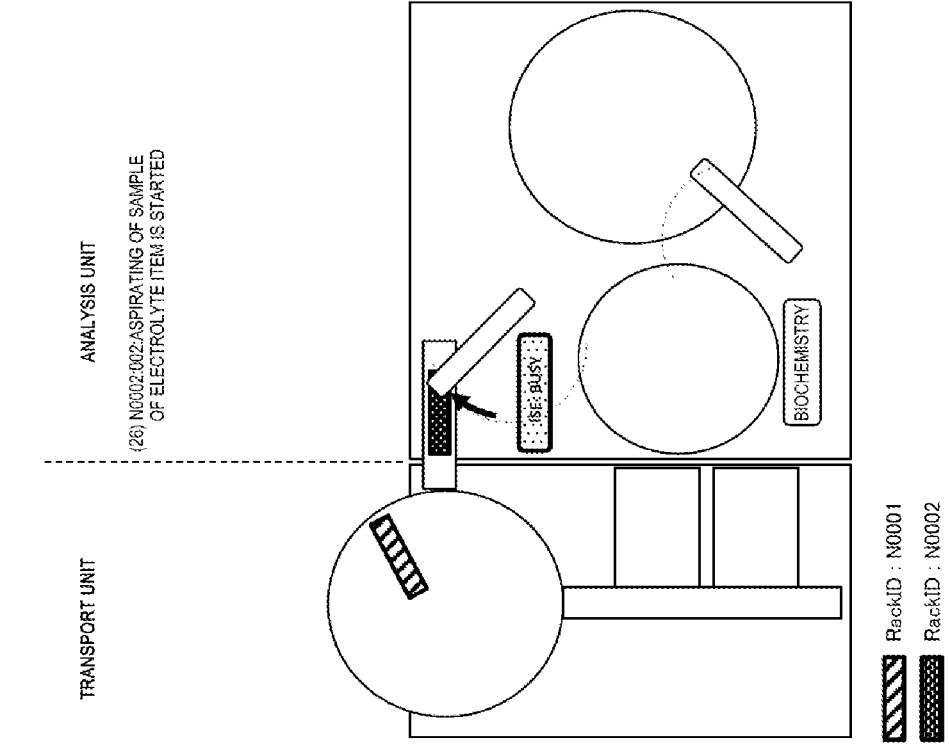

[FIG. 19]
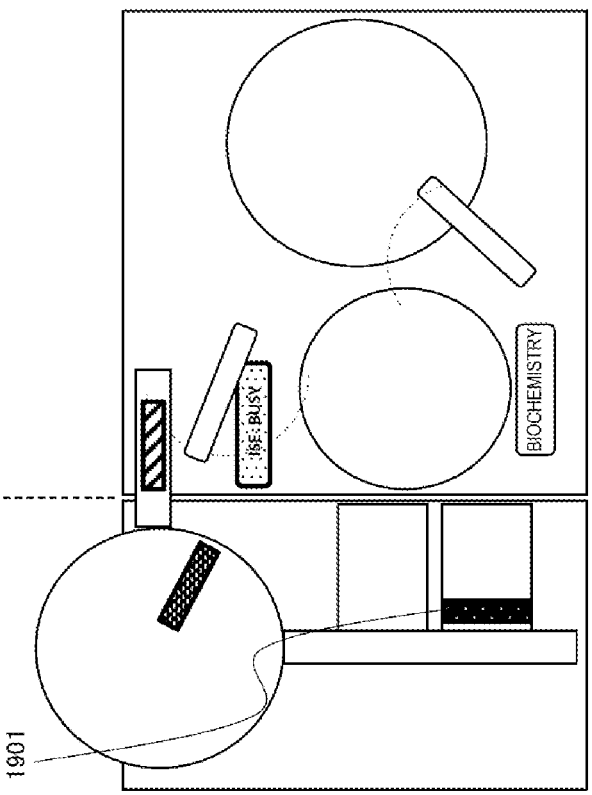

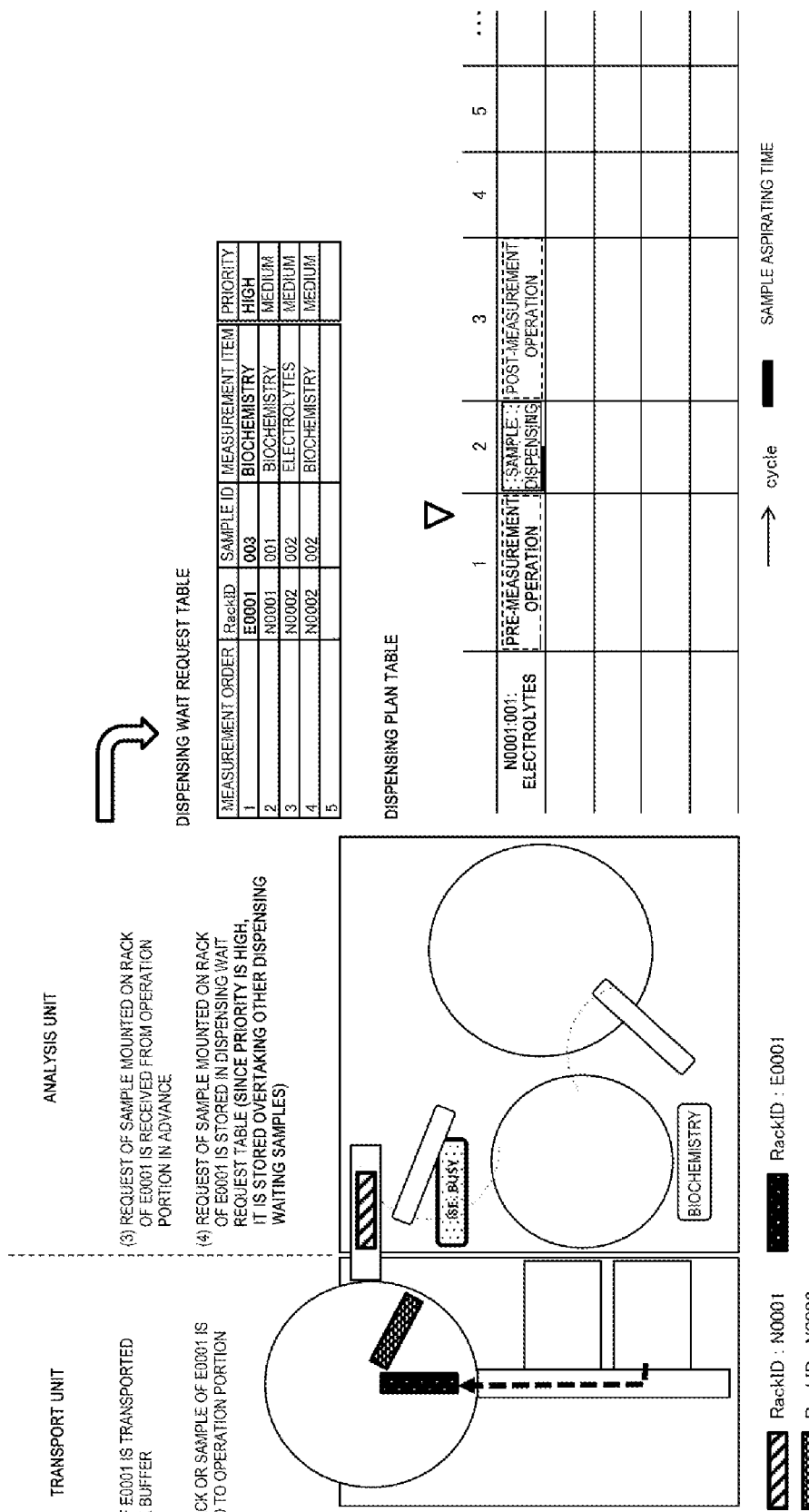
[FIG. 20]

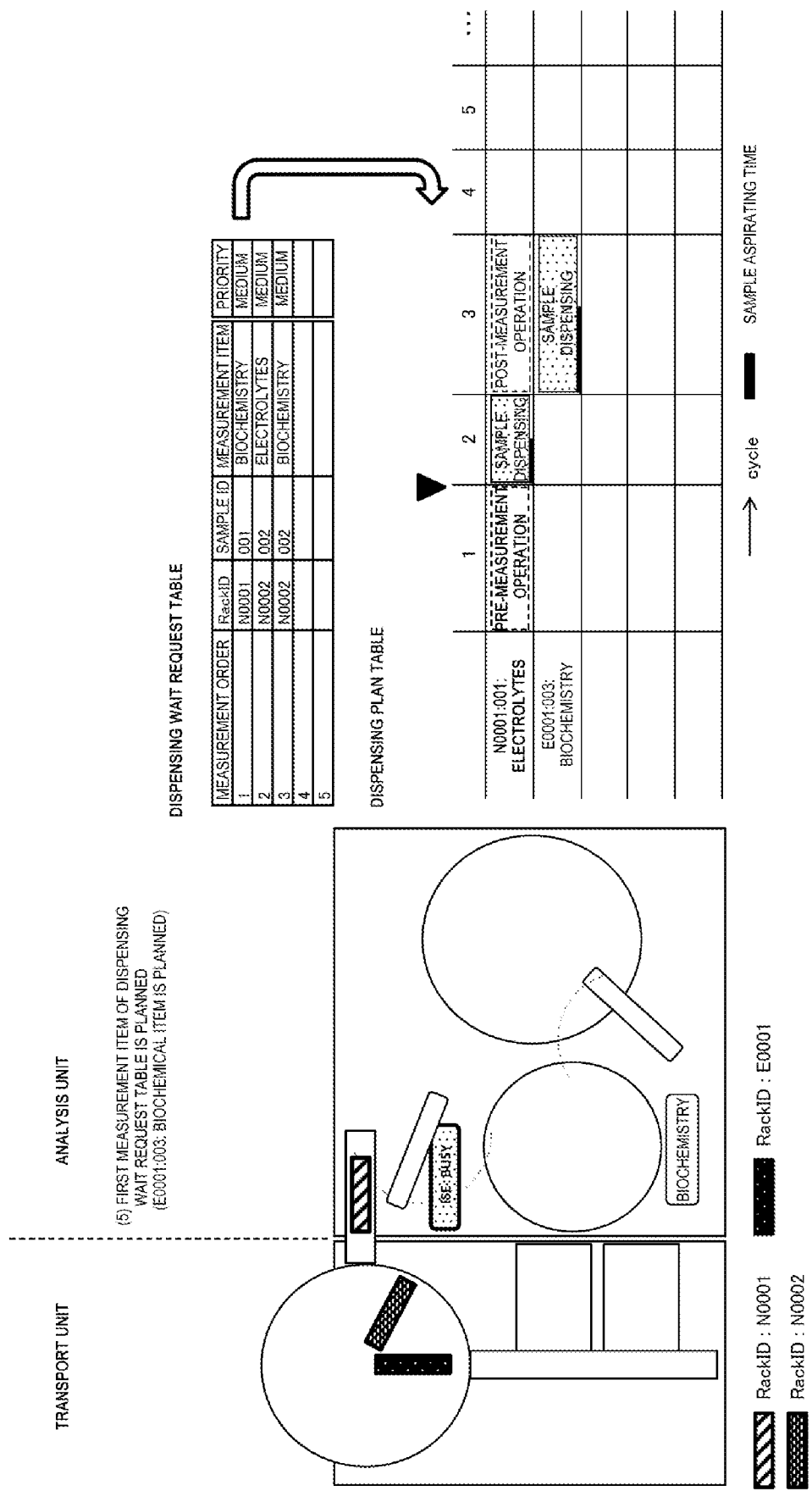
[FIG. 21]

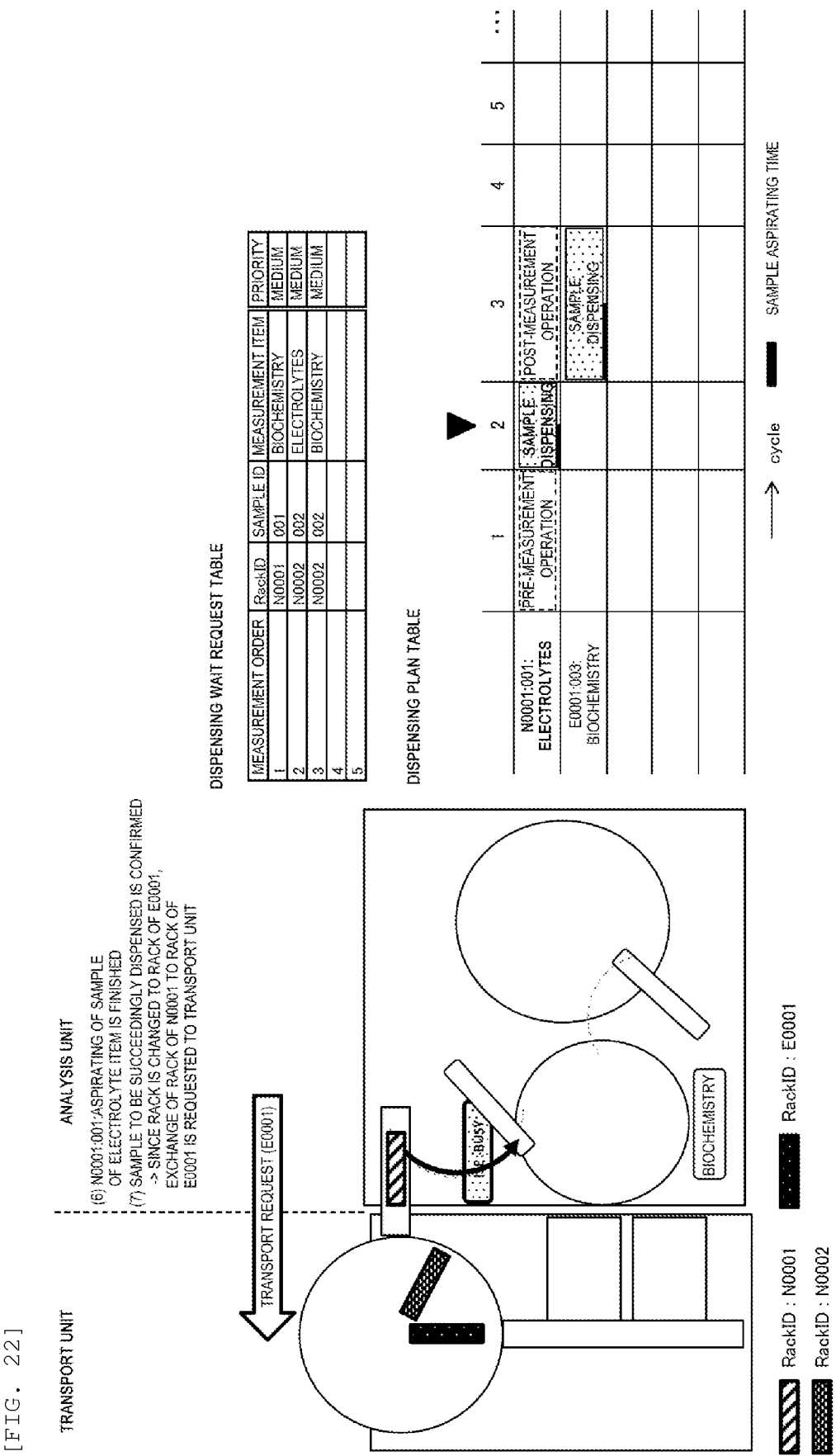
[FIG. 22]

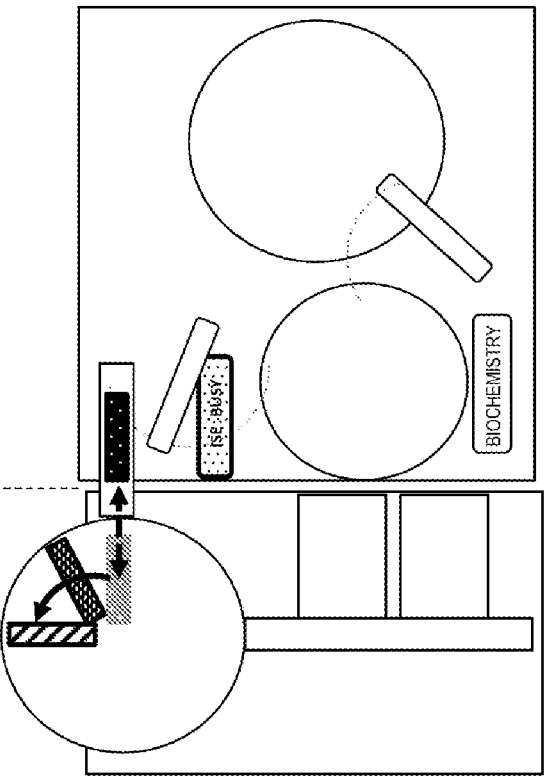
[FIG. 23]

[FIG. 24]
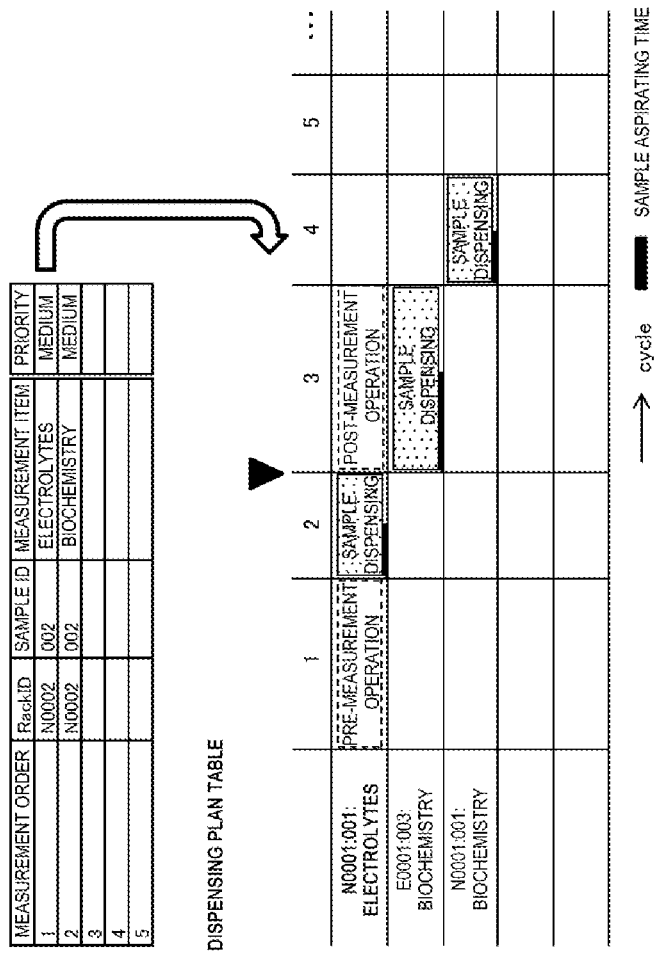
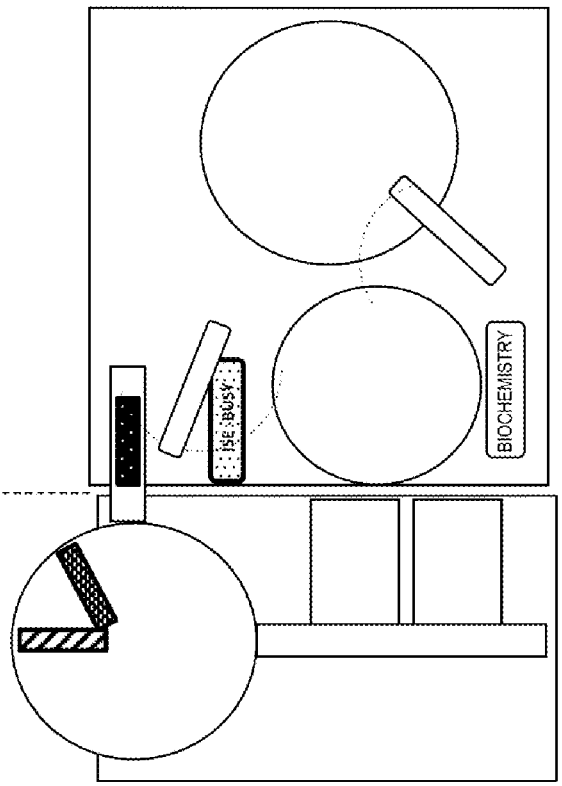

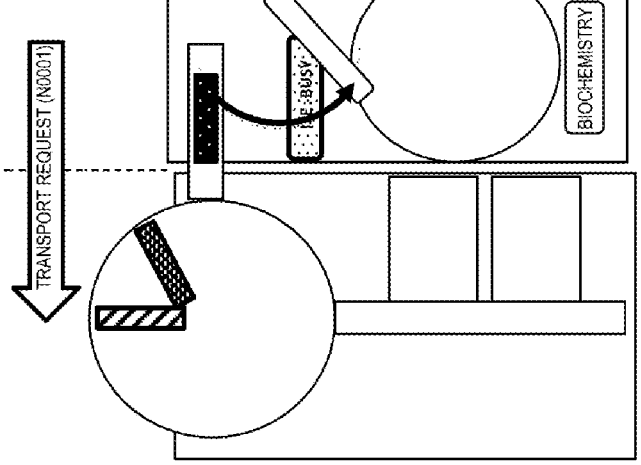
[FIG. 25]

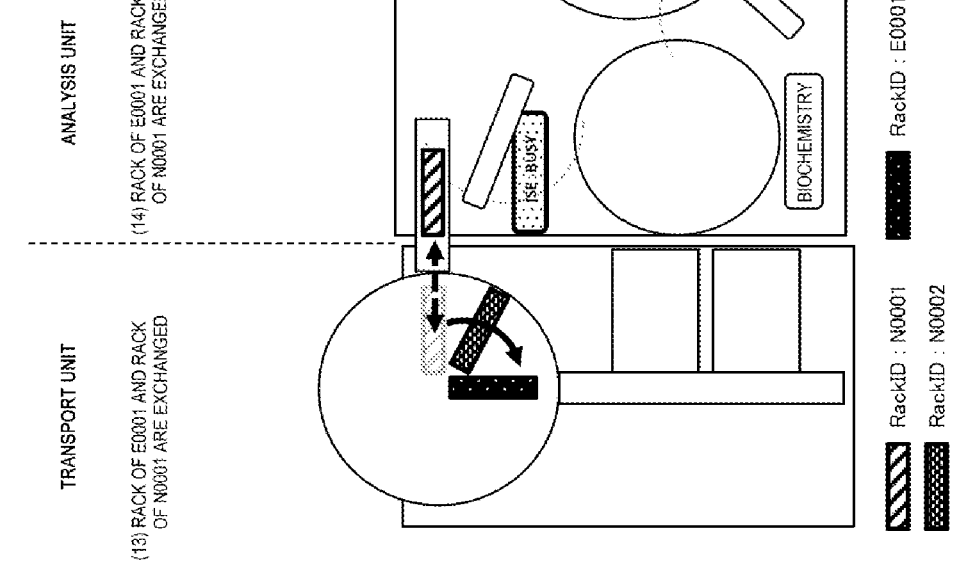
[FIG. 26]

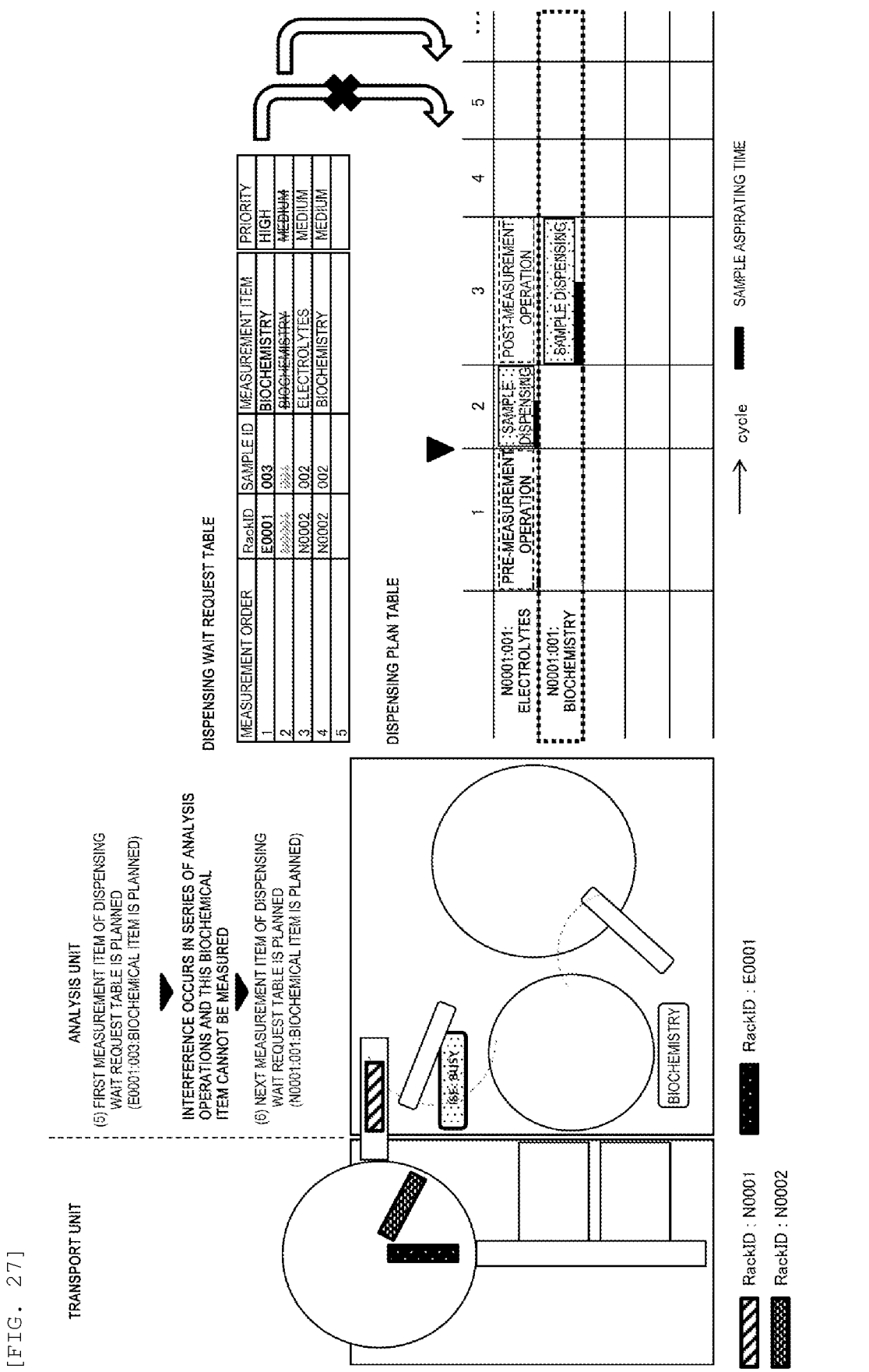
[FIG. 27]

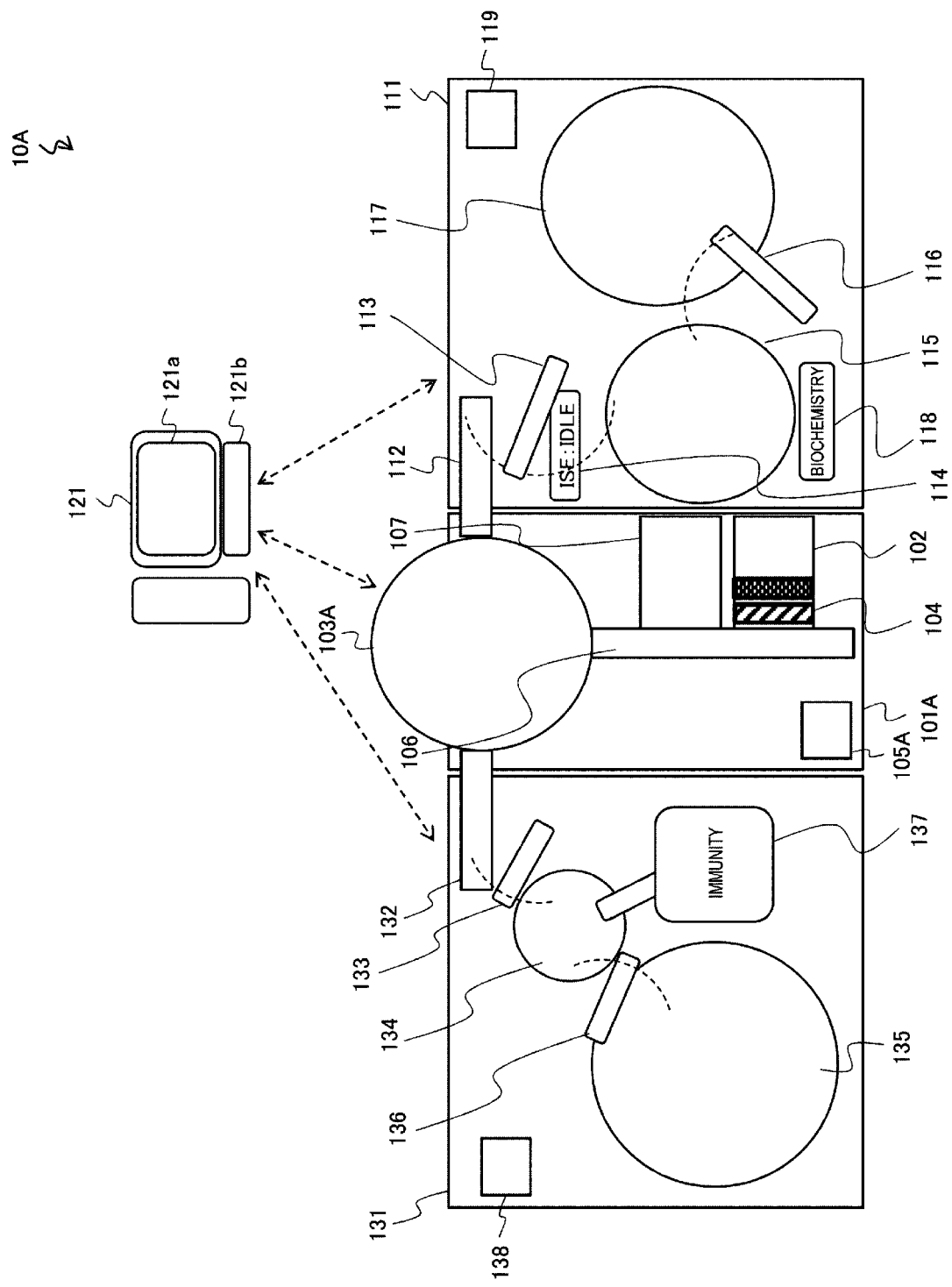
[FIG. 28]

AUTOMATED ANALYSIS DEVICE, AND METHOD FOR CONVEYING SAMPLE

TECHNICAL FIELD

The present invention relates to an automatic analyzer that performs qualitative and quantitative analysis of biological samples such as blood and urine, and a method for transporting a sample in an automatic analyzer.

BACKGROUND ART

As an example of an automatic analyzer suitable for clinical biochemical analysis used to quantitatively analyze blood components, urine components, or the like using colorimetric analysis, PTL 1 describes the following. A top surface is divided into a reaction disk area in which a reaction disk holding a reaction cell is disposed and a reagent disk area in which a reagent disk holding a reagent rack is disposed. A closing lid used to cover the respective areas is provided, and the closing lid is temporarily fixed to the top surface of the automatic analyzer so as not to be capable of being opened in a normal usage state. The reagent disk can doubly house the reagent rack in a concentric circle shape and is provided with a mechanism used to automatically load the reagent rack. A reagent rack loading port is disposed on a side surface of the automatic analyzer, and a reagent tray which can close the reagent rack loading port so as to be covered is provided. A reagent rack guide groove is disposed so as to be connected to the reagent rack loading port on an upper surface of the reagent tray when opening.

CITATION LIST

Patent Literature

PTL 1: JP-A-2003-262642

SUMMARY OF INVENTION

Technical Problem

In recent years, in the field of clinical testing, in response to a demand to integrate testing operations, there is an increasing need for an automatic analyzer in which analysis units using different measuring methods such as biochemical items and immune items are connected to one independent transport unit and the analysis units can be flexibly changed according to an operation of a user.

In this background, in recent years, the number of modular type devices in which the transport unit and the analysis unit are implemented by independent computers has been increasing.

Further, in response to a demand for space saving, there is an increasing need for an automatic analyzer in which analysis units using different measuring methods such as electrolyte items in addition to the above-described biochemical items are integrated into one analysis unit.

These needs are required not only for large-sized and medium-sized automatic analyzers that process a large number of samples per day, but also for small-scale small-sized automatic analyzers.

However, these analysis units are not limited to those in which measurement operations for all measurement items, for example, in measurement of biochemical items, are started from aspiration of a sample.

For example, regarding measurement of an electrolyte item, it is necessary to measure an electromotive force of an internal standard solution having a known concentration immediately before aspirating a sample and reflect the electromotive force in calculation of a concentration of a component contained in the sample. Therefore, it is necessary to start from a measurement operation of the electromotive force of the internal standard solution first, and to control the electromotive force such that the sample is aspirated after a timing when the measurement operation is completed.

That is, when a biochemical item is measured, a measurement operation is planned and the measurement is started after a sample arrives in an analysis unit. On the other hand, when an electrolyte item is measured, if a measurement operation is planned after the sample arrives in the analysis unit as in the case of the biochemical item, there is a problem that an extra time is required until the sample is aspirated.

In addition, as described above, when an analysis unit that integrates biochemical items and electrolyte items is connected to an independent transport unit implemented by different computers, it is necessary to sequentially change a timing of sample delivery according to an item expected by the analysis unit, which causes a problem that the sample delivery becomes complicated.

To solve such a problem, the configuration of the automatic analyzer as illustrated in PTL 1 is disclosed as an example in the related art.

Further, in the current automatic analyzer, when being connected to an independent transport unit, the analysis unit generally has a waiting position where the sample can be stored in advance in addition to a position where the sample is aspirated. Accordingly, if the waiting position is vacant on the transport unit side, the sample can be delivered in advance without being affected by a dispensing situation of the sample on the analysis unit side, and on the analysis unit side, the sample in the own unit can be freely moved and dispensed without being affected by a supply on the transport unit side.

However, if the analysis unit is provided with a waiting position, there is a problem that an arrangement area of the analysis unit becomes large accordingly. In addition, it is necessary to add a mechanism for controlling the waiting position, and there is a problem that a cost increases.

In particular, it is difficult to adopt such a configuration because an automatic analyzer in a small-size field needs to be provided at a small space and at a low cost.

Further, for a device obtained by integrating a plurality of analysis units in the same computer, since the sample is always in its own unit, the device can freely move and dispense the sample without being affected by other computers.

However, when the analysis units are mounted in the same computer, the device may move the sample freely. Therefore, there is a problem that it becomes difficult for the user to flexibly add the sample. In addition, there is a problem that it becomes difficult to flexibly change the configuration of the analysis units.

To solve these problems, there is an automatic analyzer in which an independent transport unit and analysis units for measuring biochemical items and electrolyte items are connected as described in PTL 1.

According to the automatic analyzer described in PTL 1, it is considered that the biochemical items and the electrolyte items can be measured in a mixed manner and the analysis units can be connected to the independent transport unit. In PTL 1, when an electrolyte item is measured, an analysis order is devised so as to start from the aspiration of the sample as in a biochemical item.

Here, when the measurement of the electrolyte item is started, the sample is first aspirated, and the sample is once added to a reaction container used for the measurement of the biochemical item. Then, after a certain period of time has passed, an electrolyte unit starts measuring the electromotive force of the internal standard solution, and at an end of the measurement, an electromotive force of the electrolyte item is measured by aspirating the sample added to the reaction container and adding the sample to an electrolyte measurement unit by using a newly disposed probe. With this method, it is possible to plan a measurement operation for both the biochemical item and the electrolyte item after the sample arrives.

However, in the case of this method, since it is necessary to add a new mechanism, there is a problem that the cost increases and the arrangement area of the device increases accordingly. Further, if such a method is adopted, the measurement of the electrolyte item and the measurement of the biochemical item are dependent on each other. Therefore, for example, if an abnormality occurs during the measurement of the biochemical item, the measurement of the electrolyte item is also stopped, and the independence of each measuring method is impaired. Further, since the reaction container used for measuring the biochemical item is used in the measurement of the electrolyte item, a detergent for cleaning the reaction container is also consumed excessively, and there is a concern that the running cost may increase.

The invention provides an automatic analyzer in which a sample can be transported at an optimum timing and a method for transporting a sample.

Solution to Problem

The invention includes a plurality of means for solving the above problems, and an automatic analyzer as an example is provided. The automatic analyzer for analyzing a sample includes: an analysis unit which measures the sample; a transport unit which transports the sample to the analysis unit; and a control unit which controls the analysis unit and the transport unit so as to transport the sample to the analysis unit by a time of starting an aspirating operation on the sample by allowing the analysis unit to perform a pre-measurement operation for each measuring method which needs to be performed before aspirating the sample even when the sample is still in the transport unit.

Further, a method for transporting a sample to an automatic analyzer for analyzing a sample is provided. The automatic analyzer includes an analysis unit for measuring the sample, a transport unit for transporting the sample to the analysis unit, and a control unit for controlling a transport time of the sample based on an analysis plan created by the analysis unit. The method includes steps of: allowing the analysis unit to perform a pre-measurement operation for each measuring method which needs to be performed before aspirating the sample even when the sample is still in the transport unit; and controlling the transport unit so as to transport the sample to the analysis unit by a time of starting an aspirating operation on the sample.

Advantageous Effect

According to the invention, a sample can be transported at an optimum timing. Problems, configurations, and effects other than those described above will be further clarified with the following description of examples.

BRIEF DESCRIPTION OF DRAWINGS

FIG. 1 is a view schematically illustrating an overall configuration of an automatic analyzer according to an Example 1 of the invention.

FIG. 2 is a view illustrating an initial situation of sample transport procedures using the automatic analyzer of the Example 1 illustrated in FIG. 1.

FIG. 3 is a view illustrating a situation in which a first rack is transported from the situation illustrated in FIG. 2.

FIG. 4 is a view illustrating a situation in which a request of a sample of the first rack is received by an operation portion from the situation illustrated in FIG. 3.

FIG. 5 is a view illustrating a situation in which a plan of a first measurement item of a dispensing wait request table is performed from the situation illustrated in FIG. 4.

FIG. 6 is a view illustrating a situation in which measurement of the relevant cycle on the dispensing plan table is started from the situation illustrated in FIG. 5.

FIG. 7 is a view illustrating a situation in which a second rack is transported from the situation illustrated in FIG. 6.

FIG. 8 is a view illustrating a situation in which a request of a sample of the second rack is received by the operation portion from the situation illustrated in FIG. 7.

FIG. 9 is a view illustrating a situation in which a transport request of a specimen rack of the first rack is performed from the situation illustrated in FIG. 8.

FIG. 10 is a view illustrating a situation in which the specimen rack of the first rack is transported from the situation illustrated in FIG. 9.

FIG. 11 is a view illustrating a situation in which a plan of the first measurement item of the dispensing wait request table is performed from the situation illustrated in FIG. 10.

FIG. 12 is a view illustrating a situation in which dispensing of the relevant cycle on the dispensing plan table is started from the situation illustrated in FIG. 11.

FIG. 13 is a view illustrating a situation of confirming a sample to be succeedingly measured from the situation illustrated in FIG. 12.

FIG. 14 is a view illustrating a situation in which a plan of the first measurement item of the dispensing wait request table is performed from the situation illustrated in FIG. 13.

FIG. 15 is a view illustrating a situation in which dispensing and measurement of the relevant cycle on the dispensing plan table are started from the situation illustrated in FIG. 14.

FIG. 16 is a view illustrating a situation in which a transport request of a rack is performed from the situation illustrated in FIG. 15.

FIG. 17 is a view illustrating a situation in which transporting of the rack is performed from the situation illustrated in FIG. 16.

FIG. 18 is a view illustrating a situation in which dispensing of the relevant cycle on the dispensing plan table is started from the situation illustrated in FIG. 17.

FIG. 19 is a view illustrating an initial situation in a case of transporting a rack requiring urgency in the middle of the sample transport procedures using the automatic analyzer of the Example 1 illustrated in FIG. 1.

FIG. 20 is a view illustrating a situation in which a request of the sample of the first rack is received by the operation portion from the situation illustrated in FIG. 19.

FIG. 21 is a view illustrating a situation in which a plan of the first measurement item of the dispensing wait request table is performed from the situation illustrated in FIG. 20.

FIG. 22 is a view illustrating a situation in which a transport request of the specimen rack of the first rack is performed from the situation illustrated in FIG. 21.

FIG. 23 is a view illustrating a situation in which the specimen rack of the first rack is transported from the situation illustrated in FIG. 22.

FIG. 24 is a view illustrating a situation in which a plan of the first measurement item of the dispensing wait request table is performed from the situation illustrated in FIG. 23.

FIG. 25 is a view illustrating a situation in which a transport request of the urgent specimen rack is performed from the situation illustrated in FIG. 24.

FIG. 26 is a view illustrating a situation in which transporting of the urgent specimen rack is performed from the situation illustrated in FIG. 25.

FIG. 27 is a view illustrating a situation in a case where processing for replanning a succeeding measurement item is added when a plan of the first measurement item of the dispensing wait request table cannot be performed from the situation illustrated in FIG. 21.

FIG. 28 is a view schematically illustrating an overall configuration of an automatic analyzer according to an Example 2 of the invention.

DESCRIPTION OF EMBODIMENTS

Hereinafter, examples of an automatic analyzer and a method for transporting a sample of the invention will be described with reference to the drawings.

Example 1

Example 1 of the automatic analyzer and the method for transporting a sample of the invention will be described with reference to FIGS. 1 to 27.

First, the overall configuration of the automatic analyzer of the present example will be described with reference to FIG. 1. FIG. 1 is a view schematically illustrating an overall configuration of the automatic analyzer according to the present example.

An automatic analyzer (10) in FIG. 1 is a device for performing qualitative and quantitative analysis of a biological sample such as blood or urine, and mainly includes a transport unit (101), an analysis unit (111), and an operation portion (controller) (121).

The transport unit (101) is a unit for putting a specimen rack (104) equipped with one or more sample containers containing the biological sample such as blood or urine to be analyzed into the automatic analyzer (10) and collecting the specimen rack (104), and at the same time, transporting to the analysis unit (111).

The transport unit (101) includes a rack buffer (103), a rack supply tray (102), a rack storage tray (107), a transport line (106), and a transport control unit (105).

In the transport unit (101), the specimen rack (104) disposed in the rack supply tray (102) is transported to the rack buffer (103) by the transport line (106). There is a sample presence or absence determination sensor (not illustrated) in the middle of the transport line (106), and the presence or absence of the sample container on the specimen rack (104) is recognized. If it is determined that there is a sample container, a sample barcode (not illustrated) affixed on the sample container is read by a sample barcode reader (not illustrated) to recognize identification information of the sample. In a real system, the identification information identifies a patient.

The rack buffer (103) has a rotor structure that performs circular motion, and has slots for radiatively holding a plurality of specimen racks (104) on a concentric circle on which a plurality of sample containers are placed on an outer circumference. By rotating the slots with a motor, the slots are configured to carry in and out any specimen rack (104) to a requested destination. According to such a structure, it is not always necessary to process the specimen racks (104) placed first in order. In other words, if a specimen rack has a high priority, the specimen rack can be processed first.

The transport line (106) is connected to a certain point on the radial circumference of the rack buffer (103), and the specimen rack (104) is carried in and out. If the point is at a position of 0 degrees on the circumference, a sample dispensing line (112) for drawing the specimen rack (104) into the analysis unit (111) described later is connected at a position of 90 degrees on the circumference from the position where the transport line (106) is connected, and the specimen rack (104) is carried in and out.

The specimen rack (104) that has been dispensed in the analysis unit (111) waits for output of a measurement result, and if necessary, processing such as automatic retesting can be performed in the rack buffer (103). Further, when the processing is completed, the specimen rack (104) is transported to the rack storage tray (107) via the transport line (106).

The transport control unit (105) is a unit that executes control of an operation of transporting an appropriate specimen rack (104) from the rack buffer (103) to the sample dispensing line (112) based on a transport request signal from a control unit (119) of the analysis unit (111), which will be described later, and an operation of returning the specimen rack (104) from the sample dispensing line (112) to the rack buffer (103). The transport control unit (105) controls a transport operation for transporting the sample to the analysis unit (111).

The operation portion (121) includes user interfaces such as a display device (121a) that displays an operation screen for ordering a measurement item to be measured for a sample to be measured and an operation screen for confirming a measurement result, and an input device (121b) that inputs various instructions. The operation portion (121) is a unit that plays a role of integrally managing information of units of the entire automatic analyzer. The operation portion (121) is connected to the analysis unit (111) and the transport unit (101) via a wired or wireless network line.

The analysis unit (111) is a unit that performs a measurement operation for the measurement item requested for the sample and outputs the measurement result, and is connected to the transport unit (101). The analysis unit (111) includes a reaction disk (115), a reagent disk (117), the sample dispensing line (112), a reagent probe (116), a sample probe (113), a biochemical measurement unit (118), an electrolyte measurement unit (114), and the control unit (119).

Reaction containers (not illustrated) are arranged on a circumference of the reaction disk (115). The sample dispensing line (112) for carrying in the specimen rack (104) on which the sample container is placed is disposed near the reaction disk (115).

The sample probe (113) that can rotate and move up and down is disposed between the reaction disk (115) and the sample dispensing line (112). The sample probe (113) moves while drawing an arc around a rotation axis to dispense the sample from the specimen rack (104) to the reaction container.

The reagent disk (117) is a storage in which a plurality of reagent bottles (not illustrated) containing a reagent can be placed on the circumference. The reagent disk (117) is kept cold.

The reagent probe (116) that can rotate and move up and down is disposed between the reaction disk (115) and the reagent disk (117). The reagent probe (116) moves while drawing an arc around a rotation axis, accesses the inside of the reagent disk (117) from a reagent probe aspiration port, and dispenses the reagent from the reagent bottles to the reaction containers.

Further, washing tanks (not illustrated) is disposed within operation ranges of the reagent probe (116) and the sample probe (113), respectively.

The electrolyte measurement unit (114) and the biochemical measurement unit (118) are further disposed around the reaction disk (115).

The electrolyte measurement unit (114) is an analysis unit that measures an electrolyte concentration in the sample using an ion selection electrode. The electrolyte measurement unit (114) is an analysis unit that requires a pre-measurement operation for measuring an electromotive force of an internal standard solution having a known concentration before dispensing the sample.

The biochemical measurement unit (118) is an analysis unit that analyzes biochemical components in the sample by measuring an absorbance of a reaction solution produced by mixing and reacting in the reaction containers on the reaction disk (115). The biochemical measurement unit (118) includes a light source, a spectrophotometer, or the like. This biochemical measurement unit (118) is an analysis unit that does not require the pre-measurement operation like the above-described electrolyte measurement unit (114).

The control unit (119) disposed in the analysis unit (111) is connected to each mechanism in the analysis unit (111) and controls an operation of the mechanism.

In particular, in the control unit (119) of the present example, even though the sample is still in the transport unit (101), the control unit (119) controls each mechanism in the analysis unit (111) so as to transport the sample to the analysis unit (111) by a timing of starting an aspirating operation on the sample by allowing the analysis unit (111) to perform a pre-measurement operation for each measuring method which needs to be performed before aspirating the sample, and outputs a control signal to the transport control unit (105) in the transport unit (101).

Further, the control unit (119) of the present example receives in advance a time required for transporting by the transport unit (101) from the transport control unit (105), and determines a timing at which the sample is started to be transported based on a scheduled dispensing operation time of the sample planned in advance and a time required for transporting the sample from the transport unit (101) to the analysis unit (111), so that transporting of the sample is started at an optimum time for each of the connected transport units (101).

Further, the control unit (119) of the present example causes a dispensing operation of different samples to be executed during the pre-measurement operation of the sample waiting in the transport unit (101).

The details of these operations will be described in detail later with reference to FIG. 2 and subsequent drawings.

Next, an outline of a mechanical operation of the automatic analyzer (10) illustrated in FIG. 1 will be described.

The transport unit (101) sends the specimen racks (104) disposed in the rack supply tray (102) of the automatic analyzer (10) one by one onto the transport line (106) and carries the specimen racks (104) into the rack buffer (103). The specimen racks (104) transported to the rack buffer (103) are transported to the sample dispensing line (112) of the analysis unit (111).

Once the specimen racks (104) arrive at the sample dispensing line (112) of the analysis unit (111), for each sample mounted on the specimen racks (104), a dispensing operation is performed by the sample probe (113) according to the measurement item requested by the operation portion (121).

Here, when the measurement item is a biochemical item, the sample probe (113) discharges the aspirated sample into the reaction container on the reaction disk (115), and the reagent aspirated from the reagent disk (117) by the reagent probe (116) is further added to the reaction container and the mixture is stirred. Thereafter, the absorbance is measured by the biochemical measurement unit (118), and a measurement result is transmitted to the operation portion (121).

Further, when the requested measurement item is an electrolyte item, the sample probe (113) discharges the aspirated sample onto the electrolyte measurement unit (114). The electromotive force is measured by the electrolyte measurement unit (114), and the measurement result is transmitted to the operation portion (121).

The operation portion (121) obtains a concentration of a specific component in the sample by arithmetic processing based on the transmitted measurement result.

Next, a flow of analysis of the sample including the method for transporting a sample in the automatic analyzer 10 of the present example will be described with reference to FIGS. 2 to 27. FIGS. 2 to 27 are views illustrating a situation of transporting the sample by the automatic analyzer of the present example.

FIG. 2 illustrates a state in which the specimen racks (104) of "Rack ID: N0001" and "Rack ID: N0002" are disposed on the rack supply tray (102) in the automatic analyzer 10 having the configuration of FIG. 1. It is assumed that one sample of "Sample ID: 001" is disposed in "Rack ID: N0001" and one sample of "Sample ID: 002" is disposed in "Rack ID: N0002". Further, it is assumed that the "Sample ID: 001" and "Sample ID: 002" are requested to analyze the electrolyte item and the biochemical item, respectively, on the operation portion (121).

When the measurement of the device is started in this state, as illustrated in FIG. 3, the transport control unit (105) of the transport unit (101) sends the specimen rack (104) of "Rack ID: N0001" disposed on the head of the rack supply tray (102) onto the transport line (106), reads the ID attached to the specimen rack (104) and an ID of the sample mounted therein, and transports the specimen rack (104) to the rack buffer (103).

Thereafter, the transport control unit (105) of the transport unit (101) notifies the operation portion (121) of information of the specimen rack "Rack ID: N0001" and the sample "Sample ID: 001" read above.

The operation portion (121) specifies, based on the received information of "Rack ID: N0001" and "Sample ID: 001", a target sample and a measurement item requested for the sample.

In a case of an automatic analyzer in the related art, at this stage, the operation portion (121) instructs the transport unit (101) to transport the specimen rack (104) of "Rack ID: N0001" to the analysis unit (111). On the other hand, in the automatic analyzer 10 of the present example, as illustrated in FIG. 4, first, the analysis unit (111) is notified of the measurement item requested for each sample.

In this description, the transport unit (101) is not notified of anything, but the transport unit (101) may be notified that the specimen rack (104) will go to the analysis unit (111).

When the control unit (119) of the analysis unit (111) receives the requested measurement item of "Sample ID: 001" of "Rack ID: N0001" from the operation portion (121), the measurement item is stored in a dispensing wait request table (401) that waits for dispensing of the sample in the analysis unit (111). In the analysis unit (111), a series of operations for a new measurement item is planned for each analysis cycle of the device.

In this description, at the start of each cycle, a series of operations for the first measurement item is planned by referring to the dispensing wait request table (401), but the method is not particularly limited to this, and a method of collectively planning a plurality of measurement items at a certain timing in a certain cycle may be used.

Thereafter, in the present example, as illustrated in FIG. 5, the control unit (119) of the analysis unit (111) plans a series of operations for measuring a first electrolyte item of "Sample ID: 001" by referring to the dispensing waiting request table (401) at the start of the first cycle.

At this time, the specimen rack "Rack ID: N0001" on which "Sample ID: 001" is mounted is still on the transport unit (101) and is not on a computer of the analysis unit (111). However, in the invention, even though the sample is not in the computer of the analysis unit (111), a measurement operation is planned in advance and a series of operations for measurement are reserved.

As described above, the electrolyte item cannot be started from sample dispensing, and requires measurement of the internal standard solution as a pre-measurement operation and a post-measurement operation. Therefore, as illustrated in a dispensing plan table (501) of FIG. 5, the operations are planned in a form of the pre-measurement operation in the first cycle, the sample dispensing in a second cycle, and the post-measurement operation in a third cycle.

Thereafter, as illustrated in FIG. 6, in the control unit (119) of the analysis unit (111), when a time to start the planned pre-measurement operation for the electrolyte item of "Sample ID: 001" in the first cycle is reached, even though the sample is not in the analysis unit (111) but is still in the transport unit (101), a series of measurement operations for the electrolyte item of "Sample ID: 001" is started first. This step corresponds to a step of allowing the analysis unit (111) to perform a pre-measurement operation for each measuring method which needs to be performed before aspirating the sample.

On the other hand, as illustrated in FIG. 7, on the transport unit (101) side, since the carry-in of "Rack ID: N0001" is completed, the next specimen rack (104) is started to be independently carried in regardless of a situation of the analysis unit (111).

The transport control unit (105) of the transport unit (101) sends the specimen rack (104) of "Rack ID: N0002" disposed at a second position of the rack supply tray (102) onto the transport line (106), reads the ID attached to the specimen rack (104) and an ID of the sample mounted therein, and transports the specimen rack (104) to the rack buffer (103). Thereafter, similarly to "Rack ID: N0001", information of the specimen rack "Rack ID: N0002" and the sample "Sample ID: 002" read above is notified to the operation portion (121).

The operation portion (121) specifies, based on the received information of "Rack ID: N0002" and "Sample ID: 002", a target sample and a measurement item requested for the sample. Similarly, in this case, instead of instructing, by the operation portion (121), the transport unit (101) to transport the specimen rack (104) to the analysis unit (111), as illustrated in FIG. 8, first, the analysis unit (111) is notified of the measurement item requested for each sample.

When the control unit (119) of the analysis unit (111) receives the requested measurement item of "Sample ID: 002" of "Rack ID: N0002" from the operation portion (121), the measurement item is stored in the dispensing wait request table (401) that waits for dispensing of the sample in the analysis unit (111).

On the other hand, as illustrated in FIG. 9, while performing the pre-measurement operation for the electrolyte item of "Sample ID: 001", the control unit (119) of the analysis unit (111) monitors an optimum timing for performing a sample transport request to come, such that the sample is controlled to arrive from the transport unit (101) at a next scheduled sample dispensing time.

The optimum timing here is a timing at which the scheduled dispensing time of the sample planned in advance minus a transport necessary time required for transporting the sample from the transport unit (101) in this system is reached.

Since the specimen rack (104) is transported between different computers, a spare time may be added in consideration of an overhead time due to communication or the like.

Further, the transport necessary time may be fixedly defined in the analysis unit (111), but since the transport necessary time depends on a configuration of the transport unit (101), it is desirable to calculate the transport necessary time in consideration of a time received in advance from the transport control unit (105) of the transport unit (101) when the analysis unit (111) is started up and a time received from the transport unit (101).

According to the above, when the optimum timing for performing the sample transport request is reached, since "Sample ID: 001" is not in its own unit, the control unit (119) of the analysis unit (111) instructs the transport unit (101) to carry in "Rack ID: N0001" on which "Sample ID: 001" is mounted. The step corresponds to a step of controlling the transport unit (101) so as to transport the sample to the analysis unit (111).

In the transport control unit (105) of the transport unit (101), when the transport request is received from the analysis unit (111), as illustrated in FIG. 10, "Rack ID: N0001" is transported to the analysis unit (111) at the timing. In the analysis unit (111), "Rack ID: N0001" is received from the transport unit (101), and is transported to an aspiration position of the sample of the sample probe (113).

On the other hand, as illustrated in FIG. 11, since an operation enters the second cycle, at the start of the second cycle, the control unit (119) of the analysis unit (111) plans a series of operations for measuring a first biochemical item of "Sample ID: 001" by referring to the dispensing wait request table (401).

As described above, since the biochemical item starts from the sample dispensing, a pre-measurement operation like the electrolyte item becomes unnecessary, and as illustrated in the dispensing plan table (501) of FIG. 11, the biochemical item is planned in the third cycle after sample dispensing of the electrolyte item in the second cycle.

Thereafter, as illustrated in FIG. 12, in the control unit (119) of the analysis unit (111), since a time to start sample dispensing of the planned electrolyte item of "Sample ID: 001" in the second cycle is reached, when the sample dispensing is started, the sample of "Sample ID: 001" is transported to the aspiration position of the sample probe (113) at this timing, and thus a target sample can be aspirated.

Thereafter, as illustrated in FIG. 13, when sample aspiration for the electrolyte item of "Sample ID: 001" is completed, similarly, the control unit (119) of the analysis unit (111) monitors an optimum timing for performing a transport request of the sample to be succeedingly dispensed to come.

When the optimum timing for perform the sample transport request is reached, in the analysis unit (111), since "Sample ID: 001" is already in its own unit, in this case, the transport unit (101) is not required to carry in a rack, and the sample is maintained as it is.

On the other hand, as illustrated in FIG. 14, since an operation enters the third cycle, at the start of the third cycle, the control unit (119) of the analysis unit (111) plans a series of operations for measuring a first electrolyte item of "Sample ID: 002" by referring to the dispensing wait request table (401).

Since the electrolyte item is to be measured, as illustrated in the dispensing plan table (501) of FIG. 5, the operations are planned in a form of a pre-measurement operation in the third cycle, sample dispensing in a fourth cycle, and a post-measurement operation in a fifth cycle.

Thereafter, as illustrated in FIG. 15, in the control unit (119) of the analysis unit (111), since a time to start the post-measurement operation for the planned electrolyte item of "Sample ID: 001" in the third cycle is reached, the post-measurement operation is started in the electrolyte measurement unit (114).

Further, at the same time, since a time to start sample dispensing of the planned biochemical item of "Sample ID: 001" in the third cycle is reached, the sample dispensing is started. Since the sample is the same as the sample already in the aspiration position of the sample probe (113), the target sample can be aspirated.

Furthermore, at the same time, since a time to start the pre-measurement operation for the planned electrolyte item of "Sample ID: 002" in the third cycle is reached, a series of measurement operations for the electrolyte item of "Sample ID: 002" are started.

Using the invention, as illustrated in FIG. 15, not only is the sample of "Sample ID: 002" not in the computer of the analysis unit (111), but there is a different sample of "Sample ID: 001" on the sample dispensing line (112). Furthermore, a series of measurement operations for the electrolyte item of "Sample ID: 002" can be started even though this sample is being aspirated.

Thereafter, as illustrated in FIG. 16, when sample aspiration for the biochemical item of "Sample ID: 001" is completed, similarly, the control unit (119) of the analysis unit (111) monitors an optimum timing for performing a transport request of the sample to be succeedingly dispensed to come.

When the optimum timing for performing the sample transport request is reached, since "Sample ID: 002" is not in its own unit, the control unit (119) of the analysis unit (111) instructs the transport unit (101) to return the "Rack ID: N0001" which is currently on the sample dispensing line (112) and carry in "Rack ID: N0002" on which "Sample ID: 002" is mounted. The step also corresponds to a step of controlling the transport unit (101) so as to transport the sample to the analysis unit (111).

In the transport control unit (105) of the transport unit (101), when the transport request is received from the analysis unit (111), as illustrated in FIG. 17, at this timing, the rack of "Rack ID: N0001" is received from the analysis unit (111), and "Rack ID: N0002" is transported to the analysis unit (111). In the analysis unit (111), "Rack ID: N0002" is received from the transport unit (101), and is transported to an aspiration position of the sample of the sample probe (113).

Thereafter, as illustrated in FIG. 18, in the control unit (119) of the analysis unit (111), since a time to start sample dispensing of the planned electrolyte item of "Sample ID: 002" in the fourth cycle is reached, when the sample dispensing is started, the sample of "Sample ID: 002" is transported to the aspiration position of the sample probe (113) at this timing, and thus a target sample can be aspirated.

Next, in the automatic analyzer (10) illustrated in FIG. 1, a case where an urgent sample is additionally added during measurement of a normal sample will be described with reference to FIGS. 19 to 27.

FIG. 19 illustrates a state in which a specimen rack (1901) of "Rack ID: E0001" on which the urgent sample is mounted is disposed on the rack supply tray (102) at the stage of FIG. 10 in the automatic analyzer (10) having the configuration illustrated in FIG. 1. It is assumed that one sample of "Sample ID: 003" is disposed in the specimen rack (1901) of "Rack ID: E0001". Further, it is assumed that only the biochemical item is requested to "Sample ID: 003" on the operation portion (121).

In order to cope with this situation, it is desirable to add a priority column to the dispensing wait request table (401).

In such a case, as illustrated in FIG. 20, since the transport of "Rack ID: N0002" is completed, the transport control unit (105) of the transport unit (101) sends the urgent specimen rack (1901) of "Rack ID: E0001" disposed at a second position of the rack supply tray (102) onto the transport line (106), reads the ID attached to the specimen rack (104) and an ID of the sample mounted therein, and transports the specimen rack (1901) to the rack buffer (103).

Thereafter, similarly to the case of the normal specimen rack (104), the transport control unit (105) notifies the operation portion (121) of information of the specimen rack "Rack ID: E0001" and the sample "Sample ID: 003" read above.

The operation portion (121) specifies, based on the received information of "Rack ID: E0001" and "Sample ID: 003", a target sample and a measurement item requested for the sample. Similarly, in this case, as illustrated in FIG. 20, first, the analysis unit (111) is notified of measurement items requested for each sample.

Here, when the operation portion (121) recognizes that "Sample ID: 003" is an urgent sample, a priority of a measurement item to be notified to the analysis unit (111) is delivered as "high".

Further, in this description, a method of notifying the analysis unit (111) of a priority of a sample from the operation portion (121) is used, but the invention is not limited to this, and for example, the priority of the sample may be recognized as high if a Rack ID of a request received in the analysis unit (111) is a Rack ID of an urgent type.

When the control unit (119) of the analysis unit (111) receives the requested measurement item of "Sample ID: 003" of "Rack ID: E0001" from the operation portion (121), the measurement item is stored in the dispensing wait request table (401) that waits for dispensing of the sample in the analysis unit (111).

At this time, the control unit (119) compares the priority of the measurement item with a priority of a measurement item already registered in the dispensing wait request table (401). In this case, since the priority of the urgent sample is the highest, the urgent sample is stored at the first position of the dispensing waiting request table (401).

Thereafter, as illustrated in FIG. 21, since an operation enters the second cycle, at the start of the second cycle, the control unit (119) of the analysis unit (111) plans a series of operations for measuring a first measurement item by referring to the dispensing wait request table (401).

Specifically, since the first measurement item is changed to a biochemical item of the urgent sample "Sample ID: 003", the control unit (119) plans the measurement item in a usual method. Accordingly, it is possible to easily switch to an urgent sample without adding a special treatment. In this case, sample dispensing is planned in the third cycle, as illustrated in the dispensing plan table (501) in FIG. 21.

Thereafter, as the time advances, as illustrated in FIG. 22, when the sample aspiration for the electrolyte item of "Sample ID: 001" is completed, similarly, the control unit (119) of the analysis unit (111) monitors an optimum timing for performing a transport request of the sample to be succeedingly dispensed to come. Here, when a next sample is confirmed, the sample is the "Sample ID: 003" of "Rack ID: E0001" cut in.

When the optimum timing for performing the sample transport request is reached, since "Sample ID: 003" is not in its own unit, the control unit (119) of the analysis unit (111) instructs the transport control unit (105) of the transport unit (101) to return the "Rack ID: N0001" which is currently on the sample dispensing line (112) and carry in "Rack ID: E0001" on which "Sample ID: 003" is mounted, and thus as illustrated in FIG. 23, "Sample ID: 003" is transported to an aspiration position of the sample of the sample probe (113).

In this case, similarly to the above, a next target for sample dispensing is simply the biochemical item of the urgent sample "Sample ID: 003", and it is possible to easily switch to an urgent sample without adding a special treatment.

Thereafter, as illustrated in FIG. 24, since an operation enters the third cycle, at the start of the third cycle, the control unit (119) of the analysis unit (111) plans a series of operations for measuring a first measurement item by referring to the dispensing wait request table (401).

Specifically, since the first measurement item becomes the biochemical item of "Sample ID: 001" interrupted by the above urgent sample, the control unit (119) plans the measurement item in the usual method. Accordingly, it is possible to easily switch from an urgent sample plan to an interrupted sample plan without adding a special treatment. In this case, sample dispensing is planned in the fourth cycle, as illustrated in the dispensing plan table (501) in FIG. 24.

Thereafter, as the time advances, as illustrated in FIG. 25, when the sample aspiration for the biochemical item of "Sample ID: 003" is completed, similarly, the control unit (119) of the analysis unit (111) monitors an optimum timing for performing a transport request of the sample to be succeedingly dispensed to come. Here, when a next sample is confirmed, the sample is "Sample ID: 001" of "Rack ID: N0001" interrupted by the urgent sample.

When the optimum timing for performing the sample transport request is reached, since "Sample ID: 001" is not in its own unit, the control unit (119) of the analysis unit (111) instructs the transport control unit (105) of the transport unit (101) to return the "Rack ID: E0001" which is currently on the sample dispensing line (112) and carry in "Rack ID: N0001" on which "Sample ID: 001" is mounted, and thus as illustrated in FIG. 26, "Sample ID: 001" is transported to an aspiration position of the sample of the sample probe (113).

In this case, similarly to the above, a next target for sample dispensing is simply the biochemical item of "Sample ID: 001" interrupted from the urgent sample, and it is possible to easily switch from an urgent sample to an interrupted sample without adding a special treatment.

According to the method as in the present example, since sample carrying in, sample carrying out, and retracting operations from the independent transport unit (101) to the analysis unit (111) can be flexibly implemented, the following method can also be adopted by extending the operations.

For example, FIG. 27 illustrates a case that, in FIG. 21, when the biochemical item of the urgent sample "Sample ID: 003" at the first position of the dispensing wait request table (401) is to be planned at the start of the second cycle, for example, a plan for the biochemical item of "Sample ID: 003" cannot be assigned due to interference with analysis items of other samples in a series of measurement operations.

Normally, if it is determined in the previous stage that an urgent sample will interrupt, it is difficult to suddenly cancel the transporting of the urgent sample depending on the situation of the analysis unit (111).

On the other hand, in the case of the present example, by referring to the succeeding measurement item and adding only processing to be planned in the similar manner, the measurement item of the sample of "Sample ID: 001" before interruption is still planned, and the interruption of the urgent sample can also be postponed to the next cycle. Accordingly, since unnecessary empty cycles without sample dispensing are not generated, it is possible to maintain high throughput.

Next, effects of the present example will be described.

The automatic analyzer (10) of Example 1 according to the invention described above includes: the analysis unit (111) which measures the sample; the transport unit (101) which transports the sample to the analysis unit (111); and the control unit (119) which controls the analysis unit (111) and the transport unit (101) so as to transport the sample to the analysis unit (111) by a time of starting an aspirating operation on the sample by allowing the analysis unit (111) to perform a pre-measurement operation for each measuring method which needs to be performed before aspirating the sample even when the sample is still in the transport unit (101).

With such control, even if the analysis unit (111) includes two or more measurement instruments having different dispensing timings for a sample of a measurement item, the specimen rack (104) including a sample container containing the sample can be supplied from the transport unit (101) at the optimum timing according to the measuring method to start an analysis operation without changing the order of analysis and without providing a position for the sample to wait or a special mechanism. Further, on the transport unit (101) side, the sample can be supplied to the analysis unit (111) at the optimum timing for each measurement item of the analysis unit (111) without depending on the measuring method in the analysis unit (111).

Therefore, the analysis unit (111) of any configuration can be connected to the transport unit (101). That is, a flexible system configuration according to an arrangement position and application can be easily implemented as compared with the case in the related art.

Further, since it is not necessary to add a position for the sample to wait in the analysis unit (111) or a special mechanism, space saving and cost reduction of the automatic analyzer 10 can be implemented.

Further, according to the invention, it is possible to easily change a supply timing and an order of the sample flexibly. Therefore, when an urgent sample is loaded, according to the automatic analyzer configuration in the related art, in the analysis unit (111) connected to the independent transport unit (101), it is difficult to perform the complicated sample deliver and cancel between the transport unit (101) and the analysis unit (111). However, according to the invention, it is also possible to cancel the sample already planned and switch to measure the urgent sample immediately, so that a turn around time (TAT) in urgent testing can be shortened as compared with the case in the related art.

Further, since the control unit (119) determines a time at which the sample is started to be transported based on a scheduled dispensing operation time of the sample planned in advance and a time required for transporting the sample from the transport unit (101) to the analysis unit (111), the specimen rack (104) can be transported to the analysis unit (111) at a more appropriate timing.

Further, the control unit (119) causes a dispensing operation of a different sample to be executed during the pre-measurement operation of the sample waiting in the transport unit (101), and therefore vacancies can be reduced as compared with the case in the related art, the analysis operation of the sample can be executed more efficiently, and the analysis efficiency can be improved.

Further, the control unit (119) receives a time required for transporting by the transport unit (101) in advance, so that transporting of the sample is started at an optimum time for each of the connected transport units (101), and therefore even if the configuration of the automatic analyzer (10) is changed and connected to a different transport unit, it is possible to request the transporting of the sample at the optimum timing without changing the configuration of the analysis unit (111). Therefore, it is possible to more easily construct a flexible configuration according to a processing capacity required for the analyzer.

Furthermore, there are two or more biochemical measurement units (118) and electrolyte measurement units (114) in one analysis unit (111), and the measuring methods are different, in particular, the analyzer is configured with the electrolyte measurement unit (114) that requires the pre-measurement operation and the biochemical measurement unit (118) that does not require the pre-measurement operation, so that it is possible to maximize the effect of transporting the sample at the required timing of sample dispensing for each measurement item of the analysis unit (111).

Further, since the control unit (119) is disposed in the analysis unit (111), a control system required for transporting of the sample can be completed in the analysis unit (111), and it is possible to flexibly respond to changes in the configuration of the automatic analyzer (10).

Further, since the transport control unit (105) which is disposed in the transport unit (101) and controls the transport operation for transporting the sample to the analysis unit (111) based on the transport request signal from the control unit (119) is provided, the control in the transport unit (101) can be completed in the transport unit (101), and similarly, it is possible to flexibly respond to changes in the configuration of the automatic analyzer (10).

Further, since the rack buffer (103) of the rotor structure which is disposed in the transport unit (101) and radially holds the plurality of specimen racks (104) on a concentric circle, any specimen racks (104) can be delivered and processed to the analysis unit (111) in no particular order without a complicated structure.

Since the operation portion (121) that is separate from the control unit (119) and integrally manages the entire information of the automatic analyzer (10) is further provided, control carried out by the control unit (119) in the analysis unit (111) or the like can be limited to only adjusting the order of operations in the analysis unit (111), and the configuration of the control unit can be simplified. Therefore, the automatic analyzer (10) can be miniaturized and the cost can be reduced.

In the automatic analyzer (10) of the present example, an example in which the biochemical item and the electrolyte item are integrated in one analysis unit (111) is described, but the invention is not particularly limited to this, and the analysis unit may have any configuration.

Further, sample dispensing cycles of the electrolyte measurement unit (114) and the biochemical measurement unit (118) are both described as one cycle, but the invention is not particularly limited to this, and the dispensing cycles may be different from each other. Similarly, in this case, it is possible to instruct the transporting of the specimen rack (104) after monitoring that the timing minus the transport necessary time in this system is reached according to a scheduled time for aspirating the sample in a next scheduled sample dispensing operation.

Further, not only the number of sample dispensing cycles may be different, but also the time until the start of the aspiration of the sample and the time required for the aspiration of the sample may be different. Similarly, in this case, as described above, it can be dealt with only by adding a check to confirm whether, when a measurement item is planned, a difference between a sample aspiration completion time in the sample dispensing of the immediately preceding measurement item and a sample aspiration start time in the sample dispensing of the measurement item to be measured this time is less than the transport necessary time. In this case, if the difference is less than the transport necessary time, the plan will be performed again in the next cycle.

Example 2

An automatic analyzer and a method for transporting a sample according to Example 2 of the invention will be described with reference to FIG. 28. FIG. 28 is a view illustrating an outline of the automatic analyzer of the present example. The same components as in Example 1 are denoted by the same reference numerals, and the description thereof is omitted.

As illustrated in FIG. 28, an automatic analyzer (10A) of the present example is obtained by adding an analysis unit (131) for measuring an immune item to the automatic analyzer (10) illustrated in FIG. 1.

The analysis unit (131) is a unit that performs a measurement operation of a measurement item requested to a sample and outputs a measurement result, which is similar to the analysis unit (111), and includes an incubator (134), a reagent disk (135), a sample dispensing line (132), a reagent probe (136), a sample probe (133), an immunoassay unit (137), and a control unit (138).

The incubator (134) is a disk for carrying out a reaction between a sample and a reagent at a constant temperature.

The immunoassay unit (137) is an analysis unit for causing the reagent and the sample to mix and react in a reaction container (not illustrated) disposed on the incubator (134), and analyzing trace components in blood such as hormones in the sample with high sensitivity.

In the analysis unit (131), the reagent is generally dispensed into the reaction container on the incubator (134) first, and the immunoassay unit (137) is an analysis unit that requires a pre-measurement operation.

Even though the sample is still in a transport unit (101A), the control unit (138) controls each mechanism in the analysis unit (131) so as to transport the sample to the analysis unit (131) by a timing of starting an aspirating operation on the sample by allowing the analysis unit (131) to perform a reagent dispensing operation, and outputs a control signal to a transport control unit (105A) in the transport unit (101A). Since other operations are substantially the same as the control unit (119) of the analysis unit (111), the details thereof will be omitted.

Further, since structures and operations of the reagent disk (135), the sample dispensing line (132), the reagent probe (136), and the sample probe (133) are substantially the same as structures and operations of the reagent disk (117), the sample dispensing line (112), the reagent probe (116), and the sample probe (113) of the analysis unit (111), respectively, the details are omitted.

Here, since analysis processes are different between the analysis unit (111) including the biochemical measurement unit (118) and the analysis unit (131) including the immunoassay unit (137), analysis is performed by controlling mechanisms on time charts defined by different analysis cycles, and analysis processing is performed in parallel in different time cycles.

When analysis units with different analysis cycles are connected and are operated as an integrated analyzer as in the present example, it is necessary to absorb differences in the analysis cycles.

Therefore, when the specimen racks (104) are transported to and carried into the analysis units (111, 131), the transport control unit (105A) first outputs respective synchronization signals, whose output timings are shifted by a fraction of the number of analysis units (111, 131), to all of the plurality of analysis units (111, 131) during one operation cycle. When it is necessary to transport the specimen rack (104) into the own unit, the control unit (119) or the control unit (138) outputs a transport request signal of the specimen rack (104) to the transport control unit (105) within a predetermined time after the input of the synchronization signals, and executes the transport control of the specimen rack (104).

On the other hand, when it is not necessary to transport the specimen rack (104), the control unit (119) and the control unit (138) ignore the input synchronization signals.

Other configurations and operations are substantially the same as configurations and operations of the automatic analyzer and the method for transporting the sample according to Example 1 described above, and details are omitted.

Also in the automatic analyzer (10A) including at least two analysis units (111, 131) for analyzing different measurement items and having different transport destinations and the method for transporting the sample according to Example 2 of the invention, almost the similar effect as the automatic analyzer (10) and the method for transporting a sample according to Example 1 described above can be obtained.

Other Examples

The invention is not limited to the above examples, and includes various modifications. The examples described above have been described in detail for easy understanding of the invention, and are not necessarily limited to those including all the configurations described above.

Further, a part of a configuration of one example can be replaced with a configuration of another example, and the configuration of the another example can be added to the configuration of the one example. Further, another configuration may be added to a part of the configuration of each example, and the part of the configuration may be deleted or replaced with the another configuration.

REFERENCE SIGNS LIST 10, 10A: Automatic analyzer
101, 101A: Transport unit
103, 103A: Rack buffer
104: Specimen rack
105, 105A: Transport control unit
111, 131: Analysis unit
114: Electrolyte measurement unit (first measurement instrument)
118: Biochemical measurement unit (second measurement instrument)
119, 138: Control unit
121: Operation portion (integrated controller)
137: Immunoassay unit (first measurement instrument)
401: Dispensing wait request table in analysis unit
501: Dispensing plan table in analysis unit
1901: Urgent specimen rack

The invention claimed is:

1. An automatic analyzer, comprising:
a controller;
an analysis unit including a sample probe, an ion selection electrode, a light source, a photometer, and a reaction container; and
a transport unit including a first rack that holds a first sample and a second rack that holds a second sample, a rack buffer, and a sample dispensing line connecting the rack buffer and the analysis unit,
wherein the controller is configured to:
generate a first series of operations for executing a first measurement item of the first sample, the first series of operations including a first operation, a second operation and a third operation to be executed successively by the analysis unit,
execute the first operation of the first series of operations in a first cycle of the analysis unit before the first rack is transported to the analysis unit from the transport unit,
generate a second series of operations for a second measurement item of the first sample on the first rack before the second rack is transported to the analysis unit from the transport unit,
control the sample dispensing line to transport the first rack to the analysis unit,
in a second cycle of the analysis unit, which immediately follows the first cycle, control the sample probe to aspirate the first sample from the first sample rack to measure the first sample using the ion selection electrode thereby executing the second operation of the first series of operations, and
within in a third cycle of the analysis unit, which immediately follows the second cycle, simultaneously execute the third operation in the first series of operations and control the sample probe to aspirate the first sample from the first sample rack and dispense the first sample in the reaction container according to the second series of operations for the second measurement item.

2. The automatic analyzer according to claim 1, wherein the controller is configured to determine a time at which the first rack is to be transported to the analysis unit based on a schedule of the second operation of the generated first series of operations of the first sample and a time required for transporting the first sample rack from the transport unit to the analysis unit.

3. The automatic analyzer according to claim 1, wherein the controller is configured to execute a pre-measurement operation of a third sample waiting in the transport unit within the third cycle.

4. The automatic analyzer according to claim 1, wherein the controller is arranged in the analysis unit.

5. The automatic analyzer according to claim 1, wherein the controller is configured to control the sample dispensing line to transport the first rack to the analysis unit.

6. The automatic analyzer according to claim 1, wherein the rack buffer is of a rotor structure which is disposed in the transport unit and radially holds a plurality of specimen racks on a concentric circle, which hold sample containers for containing the sample being mounted on the specimen racks, the specimen racks including the first rack and the second rack.

7. A method for transporting a sample to an automatic analyzer for analyzing a sample, the automatic analyzer including: a controller; an analysis unit including a sample probe, an ion selection electrode, a light source, a photometer, and a reaction container; a transport unit including a first rack that holds a first sample and a second rack that holds a second sample, a rack buffer, and a sample dispensing line connecting the rack buffer and the analysis unit, the method comprising steps of:

generating a first series of operations for executing a first measurement item of the first sample, the first series of operations including a first operation, a second operation and a third operation to be executed successively by the analysis unit;

executing the first operation of the first series of operations in a first cycle of the analysis unit before the first rack is transported to the analysis unit from the transport unit;

generating a second series of operations for a second measurement item of the first sample on the second rack before the second rack is transported to the analysis unit from the transport unit;

controlling the sample dispensing line to transport the first rack to the analysis unit;

in a second cycle of the analysis unit, which immediately follows the first cycle, controlling the sample probe to aspirate the first sample from the first sample rack to measure the first sample using the ion selection electrode thereby executing the second operation of the first series of operations; and within in a third cycle of the analysis unit, which immediately follows the second cycle, simultaneously executing the third operation in the first series of operations and control the sample probe to aspirate the first sample from the first sample rack and dispense the first sample in the reaction container according to the second series of operations for the second measurement item.

* * * * *